United States Patent [19]

Matsubara et al.

[11] Patent Number: 6,045,771
[45] Date of Patent: Apr. 4, 2000

[54] LITHIUM-NICKEL COMPLEX OXIDE, A PROCESS FOR PREPARING THE SAME AND A POSITIVE ELECTRODE ACTIVE MATERIAL FOR A SECONDARY BATTERY

[75] Inventors: Yukio Matsubara; Masami Ueda; Tadashi Fukami; Kazumi Fujimori; Tamaki Machi, all of Toyama, Japan

[73] Assignee: Fuji Chemical Industry Co., Ltd., Toyama, Japan

[21] Appl. No.: 08/875,624

[22] PCT Filed: Nov. 22, 1996

[86] PCT No.: PCT/JP96/03436

§ 371 Date: Jul. 24, 1997

§ 102(e) Date: Jul. 24, 1997

[87] PCT Pub. No.: WO97/19023

PCT Pub. Date: May 29, 1997

[30] Foreign Application Priority Data

| Nov. 24, 1995 | [JP] | Japan | 7-329811 |
| Jan. 18, 1996 | [JP] | Japan | 8-025976 |
| Apr. 12, 1996 | [JP] | Japan | 8-115428 |
| May 21, 1996 | [JP] | Japan | 8-150127 |
| May 17, 1996 | [JP] | Japan | 8-148147 |
| Jun. 20, 1996 | [JP] | Japan | 8-181587 |

[51] Int. Cl.[7] ............................. H01M 4/32; C01G 53/04
[52] U.S. Cl. ................ 423/593; 423/600; 429/218.1; 429/223; 429/231.6; 429/231.1
[58] Field of Search ............................. 429/223, 231.3, 429/221, 224, 231.95; 423/594, 596, 599, 600, 605, 625, 632, 635, 641

[56] References Cited

U.S. PATENT DOCUMENTS

| 4,980,080 | 12/1990 | Lecerf et al. | 252/182.1 |
| 5,264,201 | 11/1993 | Dahn et al. | 423/594 |
| 5,370,948 | 12/1994 | Hasegawa et al. | 429/223 |
| 5,474,752 | 12/1995 | Yamamoto | 423/596 |
| 5,626,635 | 5/1997 | Yamaura et al. | 29/623.5 |
| 5,648,057 | 7/1997 | Ueda et al. | 423/594 |

FOREIGN PATENT DOCUMENTS

| 5-283076 | 10/1993 | Japan . |
| 8-171935 | 7/1996 | Japan . |

OTHER PUBLICATIONS

Elements of X-Ray Diffraction by B.D. Cullity. Addison-Wesley Publishing Company, Inc., p. 178, 1978.

*Primary Examiner*—Maria Nuzzolillo
*Assistant Examiner*—Jennifer O'Malley
*Attorney, Agent, or Firm*—Harold L. Novick; Nath & Associates

[57] ABSTRACT

There is provided a novel lithium nickel complex oxide represented by the general formula:

$$Li_{y-x1}Ni_{1-x2}M_xO_2$$

wherein M represents one selected from the group consisting of Al, Fe, Co, Mn and Mg, $x=x_1+x_2$, $0<x_1\leq 0.2$, $0<x_2\leq 0.5$, $0<x\leq 0.5$, and $0.9\leq y\leq 1.3$, and wherein the crystals have been sufficiently developed and are highly purified, and a positive electrode active material for a secondary battery whose stability of high discharge capacity is excellent.

3 Claims, 33 Drawing Sheets

SEM photograph (150 magnications) of the complex oxide obtained in Example 1

XRD of the complex oxide obtained in Example 1

SEM photograph (150 magnications) of the complex oxide obtained in Example 1

SEM photograph (30,000 magnications) of the complex oxide obtained in Example 1

Particle size distribution of the complex oxide obtained in Example 1

XRD of the complex oxide obtained in Example 5

SEM photograph (10,000 magnications) of the complex oxide obtained in Example 5

XRD of the complex oxide obtained in Example 6

SEM photograph (150 magnifications) of the complex oxide obtained in Example 6

SEM photograph (30,000 magnifications) of the complex oxide obtained in Example 6

Particle size distribution of the complex oxide obtained in Example 6

XRD of the complex oxide obtained in Example 9

SEM photograph (10,000 magnications) of the complex oxide obtained in Example 9

XRD of the complex oxide obtained in Example 10

SEM photograph (30,000 magnications) of the complex oxide obtained in Example 10

Particle size distribution of the complex oxide obtained in Example 10

XRD of the complex oxide obtained in Example 13

SEM photograph (10,000 magnications) of the complex oxide obtained in Example 13

XRD of the complex oxide obtained in Example 14

SEM photograph (150 magnications) of the complex oxide obtained in Example 14

SEM photograph (10,000 magnications) of the complex oxide obtained in Example 14

Particle size distribution of the complex oxide obtained in Example 14

XRD of the complex oxide obtained in Example 16

SEM photograph (1,000 magnifications) of the complex oxide obtained in Example 16

SEM photograph (10,000 magnifications) of the complex oxide obtained in Example 16

Particle size distribution of the complex oxide obtained in Example 16

XRD of the complex oxide obtained in Example 19

SEM photograph (10,000 magnications) of the complex oxide obtained in Example 19

XRD of the complex oxide obtained in Example 21

SEM photograph (50 magnifications) of the complex oxide obtained in Example 21

SEM photograph (30,000 magnifications) of the complex oxide obtained in Example 21

Particle size distribution of the complex oxide obtained in Example 21

XRD of the complex oxide obtained in Comparative Example 1

SEM photograph (1,000 magnications) of the complex oxide obtained in Comparative Example 1

SEM photograph (10,000 magnications) of the complex oxide obtained in Comparative Example 1

Particle size distribution of the complex oxide obtained in Comparative Example 1

XRD of the complex oxide obtained in Comparative Example 5

SEM photograph (3,500 magnications) of the complex oxide obtained in Comparative Example 5

SEM photograph (10,000 magnications) of the complex oxide obtained in Comparative Example 5

XRD of the complex oxide obtained in Comparative Example 15

SEM photograph (20,000 magnifications) of the complex oxide obtained in Comparative Example 15

LITHIUM-NICKEL COMPLEX OXIDE, A PROCESS FOR PREPARING THE SAME AND A POSITIVE ELECTRODE ACTIVE MATERIAL FOR A SECONDARY BATTERY

TECHNICAL FIELD

The present invention relates to a novel lithium nickel complex oxide having a high charge and discharge capacity and excellent stability in retaining the capacity so that the degree of decrease in the capacity is small even with increasing the number of cycles, to a process for preparing the same, and to a positive electrode active material for a secondary battery.

BACKGROUND ART

As small size electronic appliances have become portable in recent years, there has been an increase in demand for a lithium secondary battery having a small size, a light weight and a high energy density to replace nickel/cadmium batteries.

As active materials for a positive electrode in such a lithium secondary battery, $LiCoO_2$ and $LiNiO_2$ are layered compounds capable of being intercalated and deintercalated with lithium. Of them, $LiNiO_2$ is being investigated because of its higher electric capacity than $LiCoO_2$.

Usually $LiNiO_2$ is prepared by mixing a lithium component ($LiOH$, $Li_2CO_3$, $LiNO_3$ etc.) with a nickel component (hydroxide, carbonate etc.) in a powdery form and reacting the mixture by the so-called dry process, and hence required heating at an elevated temperature for a long time. Especially in the case of Ni, it is hard to convert a divalent ion into a trivalent ion and therefore heating at an elevated temperature for a long time was essential. Consequently, as the crystal growth proceeds, but some of the lithium is evaporated off and NiO as a by-product is formed, thereby lowering the purity.

To the contrary, the present inventors succeeded in preparing highly purified $LiNiO_2$ having a high crystallization degree by forming a uniform precursor of Li and Ni components using a wet process and heating it for a short time as disclosed in Japanese Patent Application No. 6-80895 (Japanese Patent Kokai NO. 8-130013).

As to $LiNiO_2$, however, when much of the Li was evaporated off (at the time of discharging), the structure tended to become unstable owing to the two-dimensional structure. Therefore the essential problem of a poor cycle property of a lithium secondary battery could not be completely overcome. Although the effect of improving the cycle characteristics was achieved to some extent by using the technique of the Japanese Patent Application No. 6-80895, the improvement was still insufficient for long term cycle characteristics of more than 100 cycles.

Under such circumstance, many attempts have been made to stabilize the structure by substituting a part of the nickel with another component (third component). For example, active materials of positive electrode represented by $Li_yNi_xCo_{1-x}O_2$ (wherein x is $0 < x \leq 0.75$ and y is $y \leq 1$), where Co was doped in a solid solution into $LiNiO_2$, and $Li_yNi_{1-x}Me_xO_2$ (wherein Me represents any one of Ti, V, Mn and Fe, x is $0 < x \leq 0.6$ and y is $0.2 < y \leq 1.3$), where Ti, V, Mn or Fe was doped as solid solution into $LiNiO_2$ are disclosed in Japanese Patent Kokai Nos. 63-299056 and 5-283076 respectively.

However, the process by which the third component was doped in a solid solution was carried out by a dry process described above and hence it was difficult to homogeneously dope the third component in a solid solution. The process involved the increasing the amount of the third component, heating at an elevated temperature for a long time, and inevitably pulverizing several times. Consequently, Li was evaporated off and the by-product of NiO was formed, thereby lowering the purity and sufficient improvement in the cycle property could not be achieved, as with the $LiNiO_2$ described above. Also, since the dry process required heating for a long time and pulverizing the product it was inefficient and uneconomical. Furthermore, since these dry processes take a long time for heating, it was impossible to adjust the crystal size to a desired level while keeping the crystallization degree and purity at high level.

Under these circumstances, attempts have been made to prepare spherical particles for increasing a packing density. For example, a technique is disclosed in Japanese Patent Kokai No. 7-105950 for preparing spherical $LiNiO_2$ particles having 5 $\mu$m~50 $\mu$m using spherical $Ni(OH)_2$ as a raw material. This technique is used for obtaining spherical $LiNiO_2$ by a dry process only for the purpose of increasing the packing density. But, the primary particle size and the purity of $LiNiO_2$ was not taken into consideration. The result was not satisfactory. Another technique is disclosed in Japanese Patent Kokai No. 6-333562 for preparing spherical $LiNiO_2$ having 0.1~1.1 $\mu$m using a mist dry process. In this technique, the crystal size is too fine so that the crystals are passed through a separator when employed as a battery and thus it is not practical for battery use. Especially in case of $LiNiO_2$, when the primary particles are too fine there is the problem that the storage stability is poor due to moisture absorption and so good and stable battery characteristics cannot be obtained.

Moreover, it is known that once a battery is exposed to an elevated temperature, for example in a car in the daytime, even if it is reverted to a normal temperature, the positive electrode active material is susceptible to great deterioration and discharge performance becomes poor so that the battery performance is greatly decreased.

As the means to prevent the deterioration of the positive electrode active material, in considering the fact that the finer the primary particle size, the greater the deterioration, the size of the primary particle of the active material to be prepared has been noticed.

As a process for improving the storage stability or the discharge characteristics of the positive electrode active material at high temperatures by making the primary particle size larger, there have been some attempts to make the primary particle size of the $LiCoO_2$ series larger by improving the heating conditions [Japanese Patent Kokai No. 6-243897 (0.1~2. 0 $\mu$m), Japanese Patent Kokai No. 6-325791 (0.01~5 $\mu$m) and Japanese Patent Kokai No. 7-14579 (0.01~5 $\mu$m) ].

Also, a primary particle having an average size larger than 2 $\mu$m is prepared by adding Bi oxide to the raw material resource, as proposed in Japanese Patent Kokai No. 8-55624. Thus it is easy for the $LiCoO_2$ series to have a larger primary particle size.

On the other hand, there has not yet been found an example in which the primary particle size of $LiNiO_2$ is as large as in the $LiCoO_2$, series. The reason is attributed to the fact that the synthesis of $LiNiO_2$, or the third component (M) added to the related compound $Li_yNi_{1-x}M_xO_2$, required heating at an elevated temperature for a long time because of their bad reactivity as described above, thereby Li is liable to be evaporated off. And consequently the crystal growth is difficult and the crystal becomes imperfect with many lattice defects. For this reason, the heating has been conducted at higher possible temperatures within the permissible temperature range and as a result only fine primary particles of less than 1 µm could be obtained.

DISCLOSURE OF THE INVENTION

The objects of the present invention are to provide (1) a novel lithium nickel complex oxide wherein the crystals have been sufficiently developed, are highly purified, and whose stability of a high charge and discharge capacity is excellent, (2) a process for preparing said lithium nickel complex oxide whereby the size and shape may be set as desired and (3) a positive electrode active material for a secondary battery containing the complex oxide as an effective component.

The present inventors have prepared for the first time by a wet process, a novel lithium nickel complex oxide represented by the following formula (I):

wherein M is Co, Al, Fe, Mg or Mn, $x=x_1+x_2$, x is $0<x\leq0.5$, $x_1$ is $0\leq x_1<0.2$, $x_2$ is $0<x_2\leq0.2$ and y is $0.9\leq y\leq1.3$, and wherein the crystals have been sufficiently developed and are highly purified, and stability of a high charge and discharge capacity is excellent.

The process of the present invention is characterized in that the size and shape of the primary particles for the objected lithium nickel complex oxide may be set as desired. That is, the present invention relates to a lithium nickel complex oxide which is represented by the general formula (I):

wherein M is selected from the group consisting of Al, Fe, Co, Mn and Mg, $x=x_1+x_2$, and (i) when M is Al or Fe, then x, $x_1$ and $x_2$ represent respectively $0<x\leq0.2$, $x_1=0$, and $x_2=x$;

(ii) when M is Co or Mn, then x, $x_1$ and $x_2$ represent respectively $0<x\leq0.5$, $x_1=0$, and $x_2=x$;

(iii) when M is Mg, then x, $x_1$ and $x_2$ represent respectively $0<x\leq0.2$, $0<x_1\leq0.2$, $0<x_2<0.2$; and y represents $0.9\leq y\leq1.3$, and which is characterized in that the X-ray diffraction pattern shows a ratio in the peak intensity of the face (003) to the face (104) i.e., (003)/(104) is 1.2 or higher and a ratio in the peak intensity of the face (006) to the face (101) i.e., (006)/(101) is 0.13 or lower, said face being defined by Miller indices hkl, BET specific surface area being in the range of 0.1~2 m²/g, the proportion of $Ni^{3+}$ to the total Ni being 99% by weight or higher, an average secondary particle size D being in the range of 5~100 µm with 10% of the particle size distribution being 0.5D or higher and 90% 2D or lower, with the surface of the spherical secondary particle being uneven as observed with a scanning electron microscope (SEM) and the primary particle constituting the spherical secondary particle being uniform and distributed in the range of 0.2~3.0 µm in terms of long diameter with the average diamter of 0.3~2.0 µm as observed with a SEM.

Furthermore, the present invention relates to a lithium nickel complex oxide which is represented by the general formula (I):

wherein M is selected from the group consisting of Al, Fe, Co, Mn and Mg, $x=x_1+x_2$, and (i) when M is Al or Fe, then x, $x_1$ and $x_2$ represent respectively $0<x\leq0.2$, $x_1=0$, and $x_2=x$;

(ii) when M is Co or Mn, then x, $x_1$ and $x_2$ represent respectively $0<x\leq0.5$, $x_1=0$, and $x_2=x$;

(iii) when M is Mg, then x, $x_1$ and $x_2$ represent respectively $0<x\leq0.2$, $0<x_1<0.2$ and $0<x_2\leq0.2$; and y represents $0.9<y\leq1.3$, and which is characterized in that the X-ray diffraction pattern shows a ratio in the peak intensity of the face (003) to the face (104) i.e., (003)/(104) is 1.2 or higher and a ratio in the peak intensity of the face (006) to the face (101) i.e., (006)/(101) is 0.13 or lower, said face being defined by Miller indices hkl, and an average long diameter of the primary particles is in the range of 1~10 µm as observed with a SEM.

The lithium nickel complex oxide of the present invention represented by the above general formula may be more specifically classified as shown by the following general formulae (I a)~(I c):

A lithium nickel complex oxide represented by the formula (I a):

(wherein M represents Al or Fe, x represents $0<x\leq0.2$ and y represents $0.9\leq y\leq1.3$) is one wherein a small amount of Al or Fe has been uniformly doped in solid solution in the trivalent form. The structure is stabilized and the cycle characteristics are enhanced, whereas no battery characteristics could be achieved even when Al or Fe was converted into the corresponding $LiMO_2$.

It is not preferable that x be less than 0.01, because the amount of Al or Fe doped in the solid solution is so little that the stabilization of the structure is insufficient and the cycle property becomes poor. Also, when x exceeds 0.2, the doping is insufficient and impurities are formed so that discharge capacity decreases rapidly and the desired high capacity is lost. The high capacity is an essential function for the positive electrode active material for a lithium secondary battery in the present invention.

A lithium nickel complex oxide represented by the formula (I b):

(wherein M represents Co or Mn, x represents $0<x\leq0.5$ and y represents $0.9\leq y\leq1.3$) is one wherein Co or Mn has been doped in solid solution in a relatively large amount. The structure is stabilized and a high electric capacity is retained, although the battery characteristics can also be achieved when Co or Mn was converted into $LiMO_2$.

It is not preferable that x be less than 0.01 because the amount of Co or Mn doped is little and the stabilization of the structure is insufficient. When x exceeds 0.5, in the case of Co, the amount doped is too much thereby not only is the discharge capacity decreased, but also it is not economically advantageous because of a large amount of cobalt needs to be intercalated and cobalt is expensive. Also, in the case of Mn, discharge capacity is inherently small. When x exceeds 0.5, the desired high capacity is lost. High capacity is an essential function for the positive electrode active material for a lithium secondary battery in the present invention.

A lithium nickel complex oxide represented by the following formula (I c) where M is Mg in the formula (I)

(wherein $x=x_1+x_2$ x represents $0<x\leq 0.2$, $x_1$ represents $0\leq x_1<0.2$, $x_2$ is $0<x_2\leq 0.2$ and y is $0.9\leq y\leq 1.3$) is one wherein Mg, which itself has no electric characteristics, has been uniformly and partially doped in the solid solution into each of Li and Ni layers, thereby the structure is stabilized and the cycle characteristics is enhanced.

It is not preferable that x be less than 0.01 because the amount of Mg doped is little and the stabilization of the structure is insufficient. When x exceeds 0.2, the doping is insufficient and impurities are formed so that discharge capacity decreases rapidly and the desired high capacity is lost. High capacity is an essential function of the positive electrode active material for a lithium secondary battery in the present invention.

The above-mentioned lithium nickel complex oxide of the present invention is composed of spherical particles formed by a wet-spray dry process as described later and large primary particle size formed by a subsequent press process wherein the spray dried product (spherical particle product) is employed as raw material for heating as described later.

First, the lithium nickel complex oxide of the present invention will be illustrated with respect to the spherical particles formed by the spray dry process. The spherical particle has characteristic properties as shown below.

The, first feature is that the purity is so high that any impurities cannot be detected by a X-ray diffractometry. And, a ratio in peak intensity of the face (003) to the face (104) of Miller indices hkl of the X-ray diffraction pattern i.e., (003)/(104) is 1.2 or higher and a ratio in the peak intensity of the face (006) to the face (101) i.e., (006)/(101) is 0.13 or lower, and the proportion of $Ni^{3+}$ to the total Ni is 99% by weight or higher. Thus it is highly purified. Usually the stability of the structure is enhanced by the substitution of a part of the Ni with another component (third component) but the purity decreases relative to the substitution amount.

In spite of the substitution of Al, Fe, Mg, Co or Mn having been done in the present invention, highly purified complex oxide may be obtained. That is, Al or Fe, which is a third component, is trivalent in the structure so that the structural instability of Ni by the reversible deintercalation of Li can be solved. In the case of Mg, it is intercalated into each part of the lithium and nickel layers and thereby the structural instability is avoidable. With respect to Co or Mn, each of them has been uniformly doped whereby the structural instability of Ni by reversibly deintercalation of Li can be solved. The most important feature of the present invention is that the third components is doped uniformly and in a very small amount so as to not exceed the required amount.

This has a close relationship with an aqueous solution process (wet process) as described later, as well as with the size of the primary particles as described later. The complex oxide is essentially composed of the primary particles having a specific size thereby obtaining a composition which has a high purity and a high crystallization degree and which is stable in quality.

The second feature is that the complex oxide is composed of the primary particles which are uniformly distributed in the range of 0.2~3.0 μm in terms of the long diameter with the average diameter of 0.3–2.0 μm as observed with a SEM.

In general, the size of the primary particle is important for the layered compound represented by $LiMO_2$ in light of the reversibly de-intercalation of Li. The finer the primary particles, the better the ionic conductivity inside the solid and the Li is more reversibly de-intercalatable with the outside.

On the other hand, in regard to the crystallization degree, if the primary particle is 0.2 μm or less, the crystal growth does not proceed sufficiently and the purity becomes low inevitably. Also, if it is 0.2 μm or less, then the storage stability is poor due to the moisture absorbability and so good battery characteristics cannot achieve stability. Moreover, it is desirable that the size of the primary particle be uniform assuring stable quality.

As a result of having ardently studied the primary particle size from the above viewpoints, the present inventors have found that the primary particles in the lithium nickel complex oxide of the present invention have the desirable performance when they are uniform particles distributed in the range of 0.2~3.0 μm in terms of the long diameter with the average diameter of 0.3~2.0 μm, preferably 0.3~1.0 μm, as observed with a SEM.

A third feature is that the secondary particles are made into a spherical shape by wet-spray dry processes as described later and the average size of the secondary particles D lies in the range of 5~100 μm, with 10% of the particle size distribution being 0.5D or higher and 90% 2D or lower, and the surface is uneven as can be seen by a SEM.

Also, the particle ratio (a ratio of the long diameter to the short diameter) of the spherical secondary particles as observed with a SEM lies in the range of a maximum of 1.5 or less and an average of 1.2 or less, with 90% or more of them being distributed in 1.3 or less. This indicates that they are uniform particles, even when there were some of a slightly larger particle ratio than defined above in the complex oxide prepared during pulverization after heating.

It is understood from such physical properties that, not only are they suitable for the closest packing density, but they also have an advantage when used as a battery in that the contact surface with an electrolyte and a conductive agent becomes large, thus making it is easy to de intercalate Li.

The size of the spherical secondary particles can be set to the range of 5 μm to 100 μm as desired. However, an average size of about 5~30 μm is desirable for use as the battery material from the viewpoint of processibility. Also, the BET specific surface area lies in the range of 0.1~2 m²/g. When used as the battery material, since there is no increase in the viscosity of an electrolyte, the lowering of conductivity does not occur.

The lithium nickel complex oxide represented by the general formula (I) in the present invention may be prepared by the process described below.

The lithium nickel complex oxide of the present invention may be prepared by a process which comprises reacting a basic metal salt represented by the general formula (II)

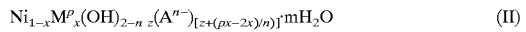

(wherein M represents one selected from the group consisting of Al, Fe, Co, Mn and Mg, p is a valence number of M and $2\leq p\leq 3$, $A^{n-}$ is an anion having a valence of n, and x, z and m are positive numbers respectively satisfying the ranges of $0<x\leq 0.2$, $0.03\leq z\leq 0.3$, $0\leq m<2$), with a water soluble lithium compound in an aqueous medium in a molar ratio of Li/(Ni+M) of 0.9~1.3 to obtain a slurry, spray drying the obtained slurry, and heating the resultant dry material at a temperature of about 600° C.–900° C. for about 4 hours or more in an oxidative atmosphere.

Both the water soluble lithium compound and the basic metal salt may each include an anion which is evaporated off during the heating.

One or more from among LiOH, $LiNO_3$, $Li_2CO_3$ and hydrates thereof may be selected as the lithium compound.

$A^{n-}$ may be selected from compounds shown by $NO_3^-$, $Cl^-$, $Br^-$, $CH_3COO^-$, $CO_3^{2-}$ and $SO_4^{2-}$ to be used in the basic metal salt represented by the general formula (II).

In the above general formula (II), when M is Al or Fe, p in $M^P$ is trivalent, thereby forming hydrotalcite compounds (in the case of Fe, a part of the divalent ion may be present and it causes no problem since it converts easily into a trivalent ion during the reaction with a lithium compound and the drying step). When M is Co or Mn, p may be divalent, trivalent or a mixture thereof since it may be used equally without a problem. When M is Mg, p is divalent.

From the viewpoint of yield, reactivity, effective utilization of the resources and oxidation accelerating effect, LiOH is preferred as the lithium compound and a basic metal nitrate where $A^{n-}$ is $NO_3^-$ is preferred as the basic metal salt represented by the general formula (II). This combination is particularly preferred from the viewpoint of battery characteristics.

It is recommended from the viewpoint of uniformity that the basic metal salt be in fine particles of 0.1 $\mu$m or less with respect to the crystallite of the primary particle as measured by the Scherrer's method.

Also, it is preferred from the viewpoint of surface reactivity that the fine particle has a BET specific surface area of 10 $m^2/g$ or higher, preferably 40 $m^2/g$ or higher, more preferably 100 $m^2/g$ or higher. As to the BET specific surface area, if it is measured after an aqueous solution of a basic metal salt has been dried, then the primary particles of very fine particles aggregate during the drying process, thus the BET specific surface area measured is one for the aggregation. If the aggregate is strong, nitrogen gas cannot enter into it so that the value of BET specific surface area becomes small. Accordingly the basic metal salt which reacts with a lithium compound in aqueous solution shows a high BET specific surface area to exhibit that the surface has a high reactivity. However, BET specific surface area was set to 10 $m^2/g$ or higher from the above actual circumstances. This basic metal salt having the specific composition has a layered structure, and both the chemical composition and the crystal structure are similar to those of $Ni_{1-x}M_x(OH)_2$. Moreover, it is microcrystalline and the surface is highly active as described above, so that it is reacted with a lithium compound such as LiOH thereby forming an extremely desirable precursor of $Li_{y-x1}Ni_{1-x2}M_xO_2$.

Highly purified $Li_{y-x1}Ni_{1-x2}M_xO_2$ having an extremely high crystallization degree at which the present invention aims can be only obtained when such a basic metal salt having a specific composition is used. The $Ni_{1-x}M_x(OH)_2$ is inferior to the basic metal salt in the reactivity with the lithium compound. On the other hand, when the amount of an anion is increased, the structure of the basic metal salt increasingly deviates from the layered structure, and the anion inhibitively acts on the formation of $Li_{y-x1}Ni_{1-x2}M_xO_2$ during heating, so that the desired compound having a high purity and an extremely high crystallization degree cannot be obtained.

The basic metal salt to be used in the present invention can be prepared by adding an alkali to an aqueous solution of $Ni_{1-x}M_x$ salt in an amount of about 0.7~0.95 equivalent, preferably about 0.8~0.95 equivalent based on the $Ni_{1-x}M_x$ salt and reacting at a temperature of about 80° C. or lower. Examples of the alkalis to be used in the reaction include alkali metal hydroxides such as sodium hydroxide, alkaline earth metal hydroxides such as calcium hydroxide, amines and the like. In this connection, it is preferable that, after the preparation, this basic metal salt is matured at 20~70° C. for 0.1~10 hours. Subsequently, any by-products are removed by washing with water and the lithium compound is added.

The drying of the slurry obtained by such a reaction is carried out by spray drying. The spray drying where drying can be instantaneously accomplished to obtain spherical particles is preferred from the viewpoint of spherical particle granulation and the uniformity of the composition. (In such dry processes requiring a certain drying time as shelf type drying and band drying ones, some Li migrates into the surface of particles to result in non-uniform composition).

In case the spherical particles with uniform composition obtained using wet and spray drying processes is subjected to the heating as it is, the heating is effected at a temperature of 600° C.~800° C., preferably 700° C.~750° C. for 4 hours or higher, preferably about 4~20 hours in an atmosphere of oxygen. If the heating time is more than 20 hours, not only does it increase the cost, but it also causes evaporation of Li and thereby the proportion of trivalent Ni to the total Ni becomes rather low and so the purity becomes poor.

In the known technique of the drying process with heating, both the Li and Ni components are non-uniform in cases where the divalent Ni is converted into trivalent Ni, and hence heating for at least 20 hours was required for Ni to become trivalent. In the light of this fact, the process of the present invention wherein a uniform spray dried powdered product is heated is very economical and advantageous.

Next, the complex oxide having large primary particles of the present invention, a process for preparing the same and a positive electrode active material for a secondary battery which contains as an effective ingredient said complex oxide will be illustrated more specifically.

An average long diameter of this large primary particle product is in the range of 1–10 $\mu$m.

By using the spherical particle product obtained by the above-mentioned spray drying process as a positive electrode active material for a secondary battery and properly setting the kind of a metal as third component and the amount to be doped in solid solution, remarkable improvement in cycle characteristics may be achieved, retaining the desired battery capacity. However, recognition regarding the safety is being requested by the public. As to the battery to be used, there has been an increase in the discussion that the use of it under severe conditions in a very rare case should be taken into consideration. Under the present situation where the function for the safety as a composite battery includes other battery materials (native electrode, an electrolyte, separator etc.) with a positive electrode active material is not yet mature, a positive electrode active material which can be used at an elevated temperature has been strongly required.

The present invention has been made to meet this requirement and provide a positive electrode active material having the following characteristic properties.

The composition of the positive electrode active material is similar to that of the above spherical particle product and the characteristic properties is characterized by a ratio in peak intensity of the face (003) to the face (104) of Miller indices hkl of the X-ray diffraction pattern i.e., (003)/(104) is 1.2 or higher and a ratio in the peak intensity of the face (006) to the face (101) i.e., (006)/(101) is 0.13 or lower, and an average long diameter of the primary particle product is a range of 1~10 $\mu$m, more preferably 2~10 $\mu$m, as measures with a SEM.

Said lithium nickel complex oxide is a novel one wherein the average long diameter of the primary particles in the sufficiently developed crystals is large and have excellent stability.

Also, it is preferable that the positive electrode active material having large primary particles is highly purified to such extent as the proportion of $Ni^{+3}$ to the total Ni is 99% by weight or higher as in the spray dried particle product described above. It should have a BET specific surface area of 0.01~1 m²/g, thus it has adversely small BET specific surface area to the extent that particles became larger. When used as a battery material, it does not cause an increase in the viscosity of the electrolyte and the reactivity with the electrolyte is small.

The lithium nickel complex oxide having a large primary particle of the present invention can be obtained by reacting a basic metal salt represented by the above mentioned general formula (II) with a water soluble lithium compound in an aqueous medium under the condition such that the molar ratio of Li/(Ni+M) becomes 0.9~1.3, spray drying the obtained slurry, and subjecting the spray dried product to press molding.

As to the process for preparing the positive electrode active material, there may be applied a process wherein the spray dried product is subjected to press molding and then the heating is conducted, and an alternative process wherein, after the spray dried product has been heated, the resultant heat-treated product is subjected to press molding and then re-heated.

The first process is one which comprises subjecting the spray, dried product to press molding and then firing the resultant molded material at a temperature of about 600° C.~900° C. for about 4 hours or more in an oxidative atmosphere.

The spherical particle product obtained by the above mentioned spray dried process has excellent flowability, molding and filling properties, and may be pressed into a shape by a conventional manner, for example under a static pressure of usually 500~3,000 kg/cm², preferably 800~1, 500 kg/cm² using a Brinell hardness tester. The press molding is of a great significance in that the moving distance among molecules becomes short and thereby the crystal growth during the firing is accelerated.

The press molded product obtained thusly can be heated as it is.

The heating is effected at a temperature of usually 600° C.~900° C., preferably 750° C.~800° C. for a period of usually 4 hours or higher, preferably 10~72 hours under an atmosphere of oxygen.

The crystal growth of primary particles during heating is accelerated by press molding and thereby a complex oxide having larger primary particles is obtained.

The process wherein the spherical particle product is hired through the press molding makes it possible to prepare a complex oxide having a high purity and a high crystallization degree even when a heating time of more than 20 hours was done. This is unlike the process wherein the spherical particle product is heated as it is because the contact area between particles becomes small because of the compressed material and evaporation of Li and formation of by-product NiO do not occur.

The second process for preparing the desired complex oxide is a process wherein the spray dried product is heated at a temperature of 600° C.~900° C. for 0.5 hours or more under an atmosphere of oxygen, the obtained heat-treated product is pulverized if necessary, then pressed into a shape in a similar manner as in the first process, and then re-heated at a temperature of 600° C.~900° C. for 1 hour or more under an atmosphere of oxygen. This process has an advantage that the total time required for the heating process may be shortened in comparison with the first process. In this regard, even when the spherical particle product which may be obtained by the above-mentioned spray drying process was heated for a long time as it was, the primary particles no longer become large. The heat-treatment for 20 hours gives an average particle size of 2 μm or less while the heat-treatment for 72 hours gives the average particle size of about 2~3 μm or less.

Also, even when the press molding process was applied to the powdered complex oxide obtained by the prior art drying process, the average particle size of the product heated for 20 hours is 1 μm or less, and there is almost no appreciable change in the particle size even when the heating time was merely extended further, as shown in Comparative Examples described later.

Therefore, the combined process of the wet, spray drying and press molding involved in the present invention is extremely advantageous in making the primary particle larger.

In addition, although a distinct cause is not yet clear, the moving distance between powder-powder and that between Li and Ni molecules are decreased by the pressing procedure according to the present process, so that the evaporation of Li and formation of the by-product NiO may be suppressed and the desired complex oxide having a high purity and a high crystallization can be obtained even when the heat process was conducted for a long time.

As is apparent from the Examples described later, the complex oxide having larger primary particle is poor in reactivity and has a small battery capacity because of the larger primary particle but the stability (cycle property and high temperature stabilities) is enhanced to that extent.

The heat-treated product composed of lithium nickel complex oxide obtained thusly may be pulverized into the desired size depending on use.

As is apparent from the Examples and Comparative Examples described later, when the lithium nickel complex oxide of the present invention is used as a positive electrode active material for a secondary battery, high discharge capacity of 130~200 mAh/g may be achieved and the decrease rate in discharge capacity is less than 10% even after 100 cycles, indicating that it can be effectively utilized because of stability.

BEST MODES FOR CARRYING OUT THE INVENTION

Figure 1:
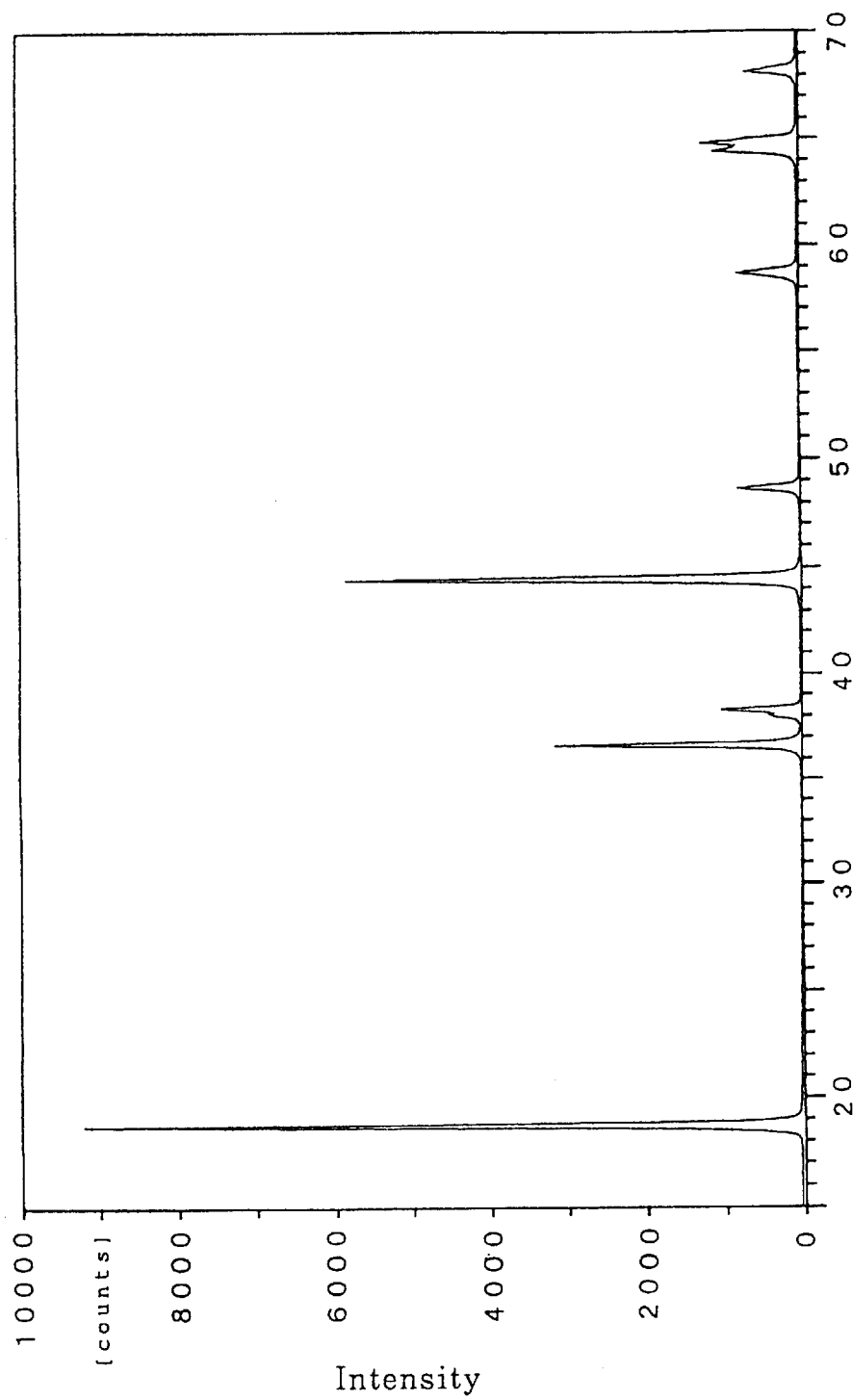
FIG. 1 is an X-ray diffraction pattern (XRD) of the complex oxide obtained in Example 1.
Figure 2:
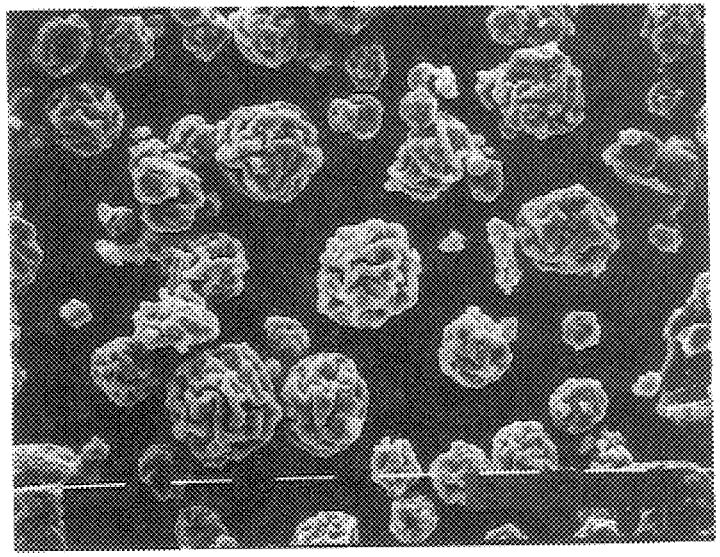
FIG. 2 is a SEM photograph (150 magnifications) of the complex oxide obtained in Example 1.
Figure 3:
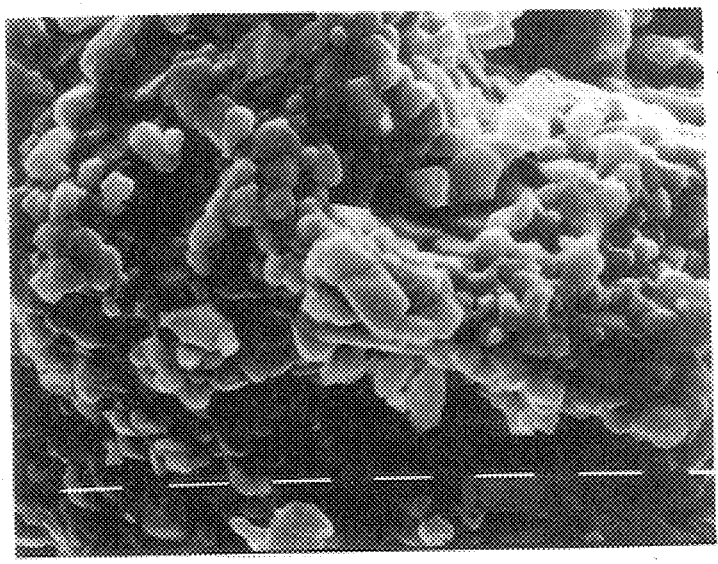
FIG. 3 is a SEM photograph (30,000 magnifications) of the complex oxide obtained in Example 1.
Figure 4:
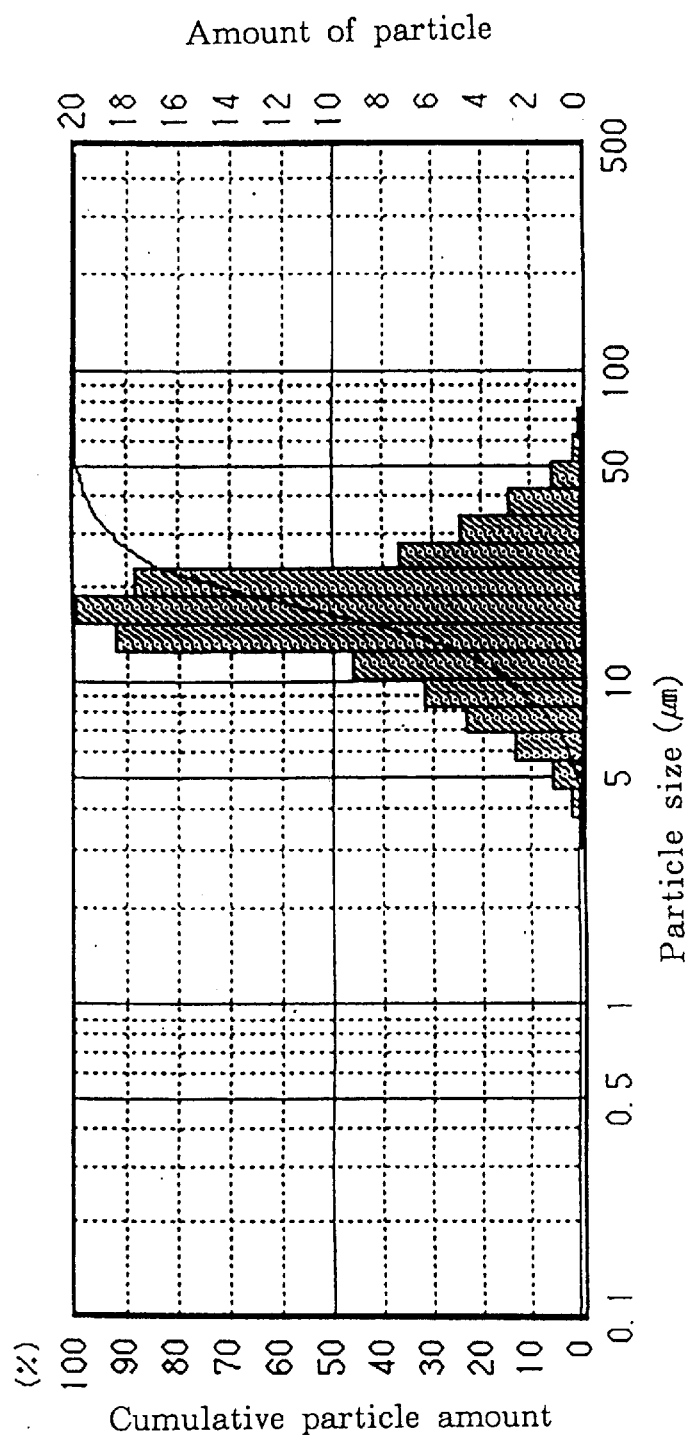
FIG. 4 is a particle size distribution of the complex oxide obtained in Example 1.
Figure 5:
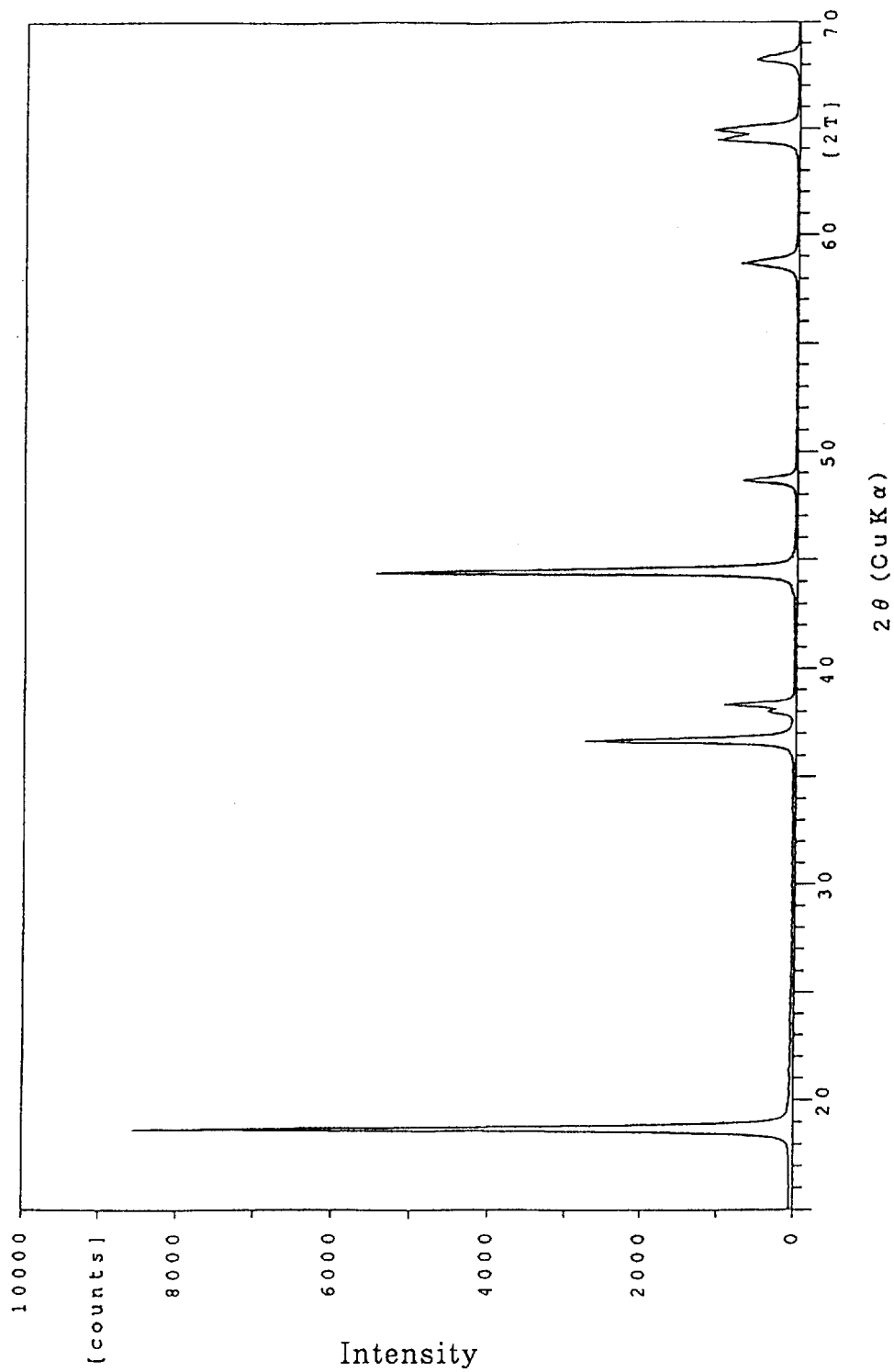
FIG. 5 is a XRD of the complex oxide obtained in Example 5.
Figure 6:
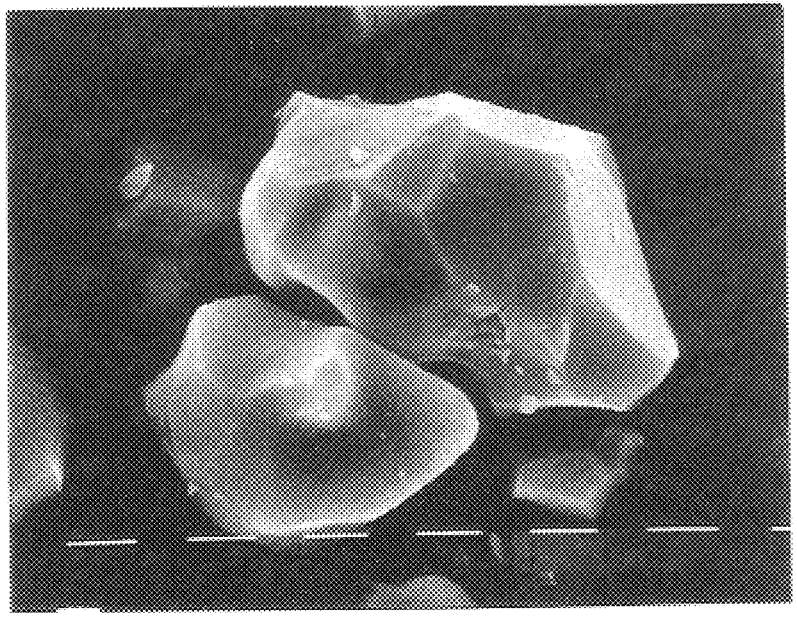
FIG. 6 is a SEM photograph (10,000 magnifications) of the complex oxide obtained in Example 5.
Figure 7:
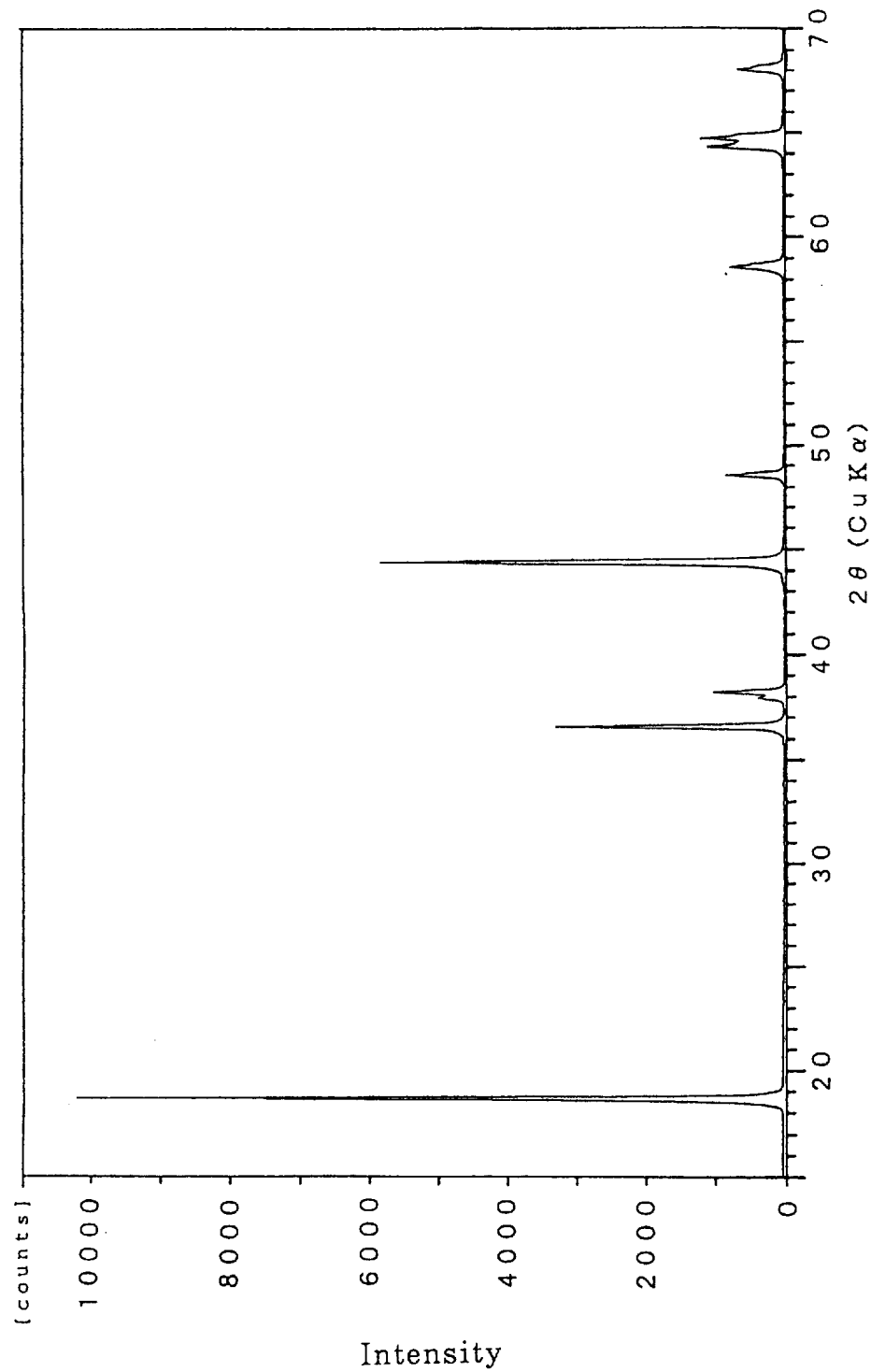
FIG. 7 is an XRD of the complex oxide obtained in Example 6.
Figure 8:
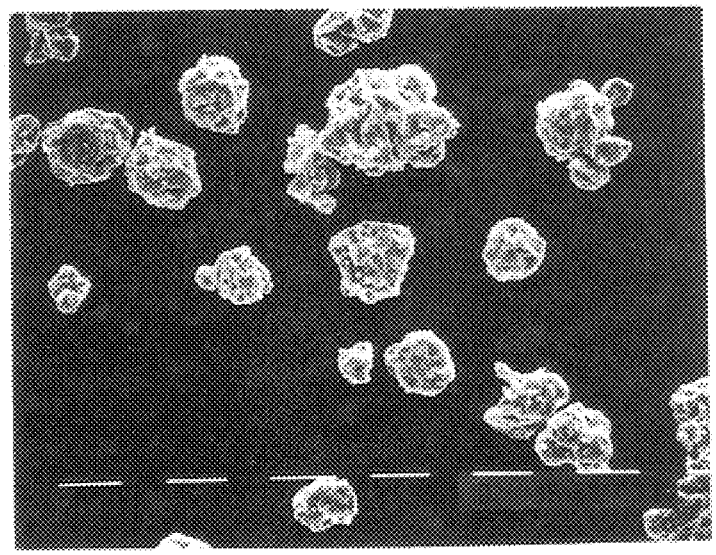
FIG. 8 is a SEM photograph (150 magnifications) of the complex oxide obtained in Example 6.
Figure 9:
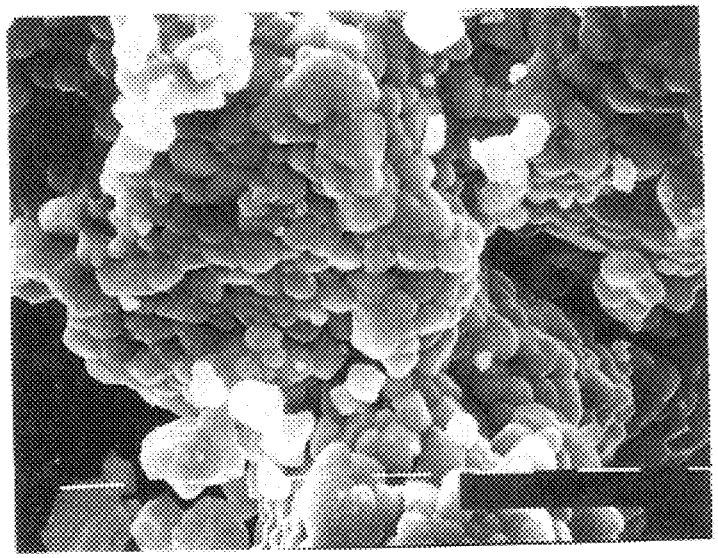
FIG. 9 is a SEM photograph (30,000 magnifications) of the complex oxide obtained in Example 6.
Figure 10:
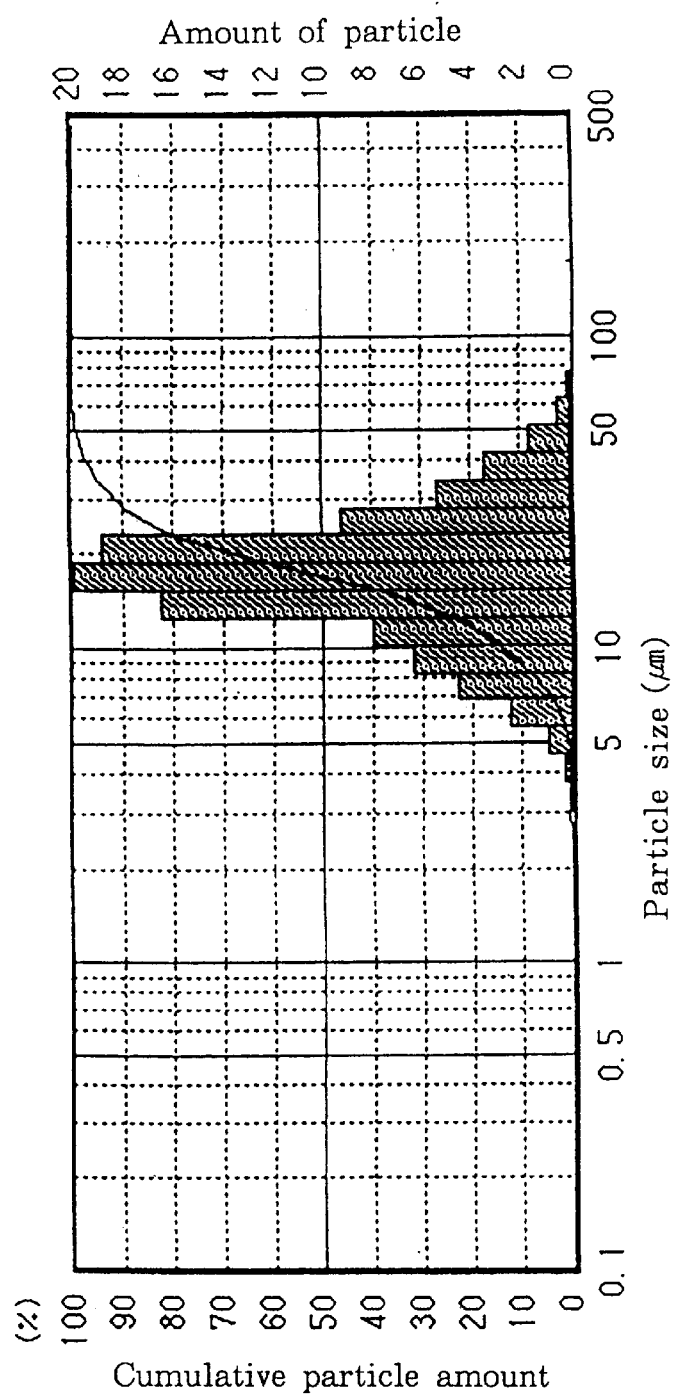
FIG. 10 is a particle size distribution of the complex oxide obtained in Example 6.
Figure 11:
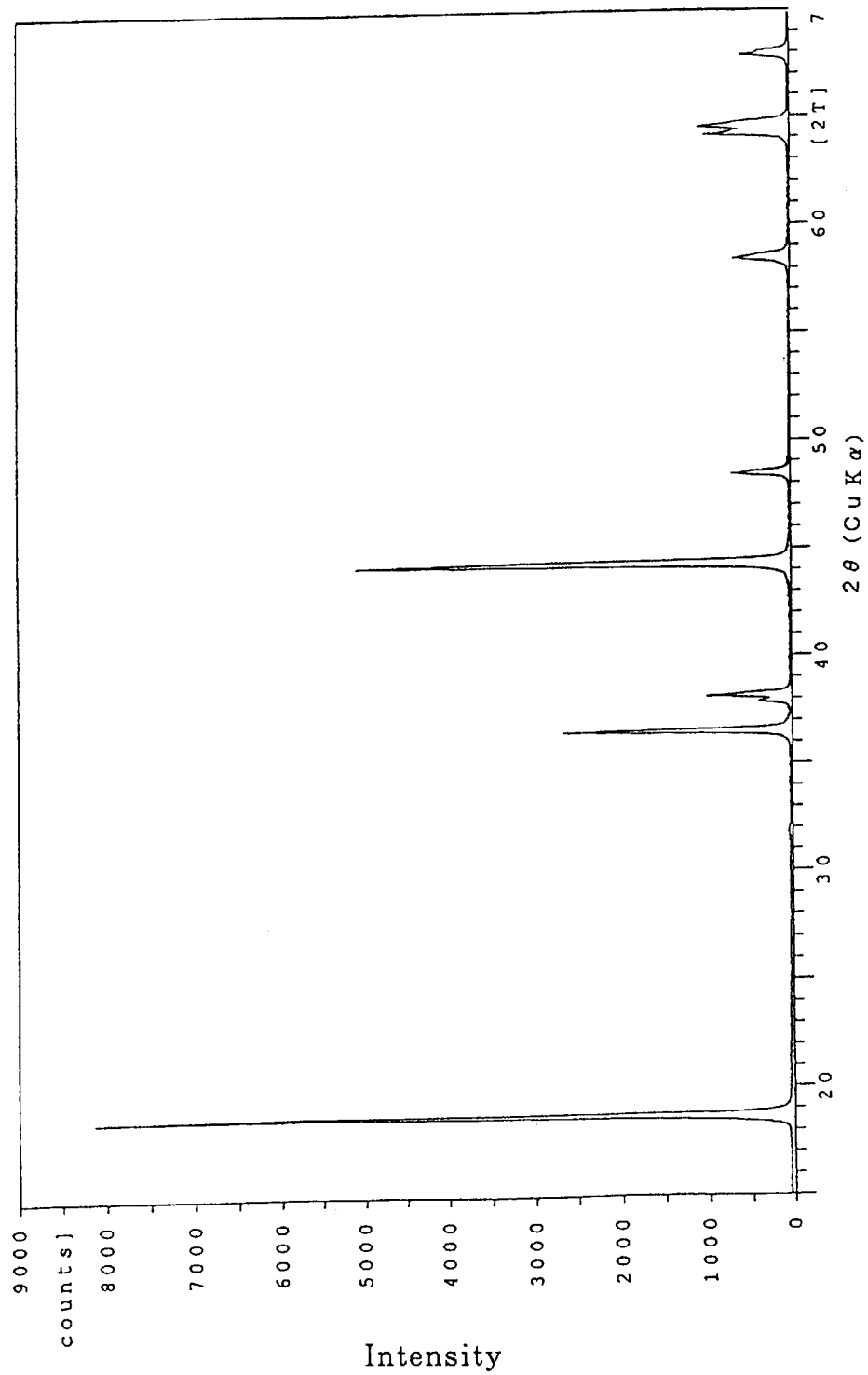
FIG. 11 is an XRD of the complex oxide obtained in Example 9.
Figure 12:
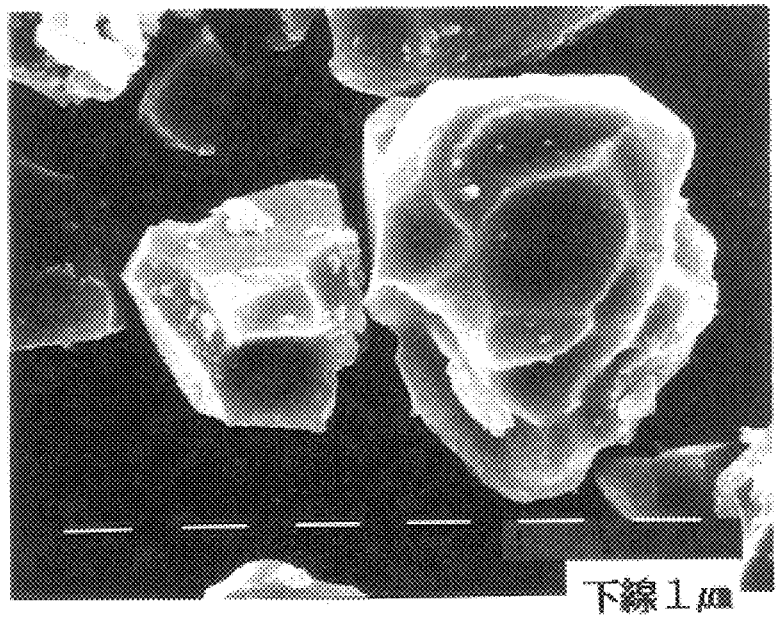
FIG. 12 is a SEM photograph (10,000 magnifications) of the complex oxide obtained in Example 9.
Figure 13:
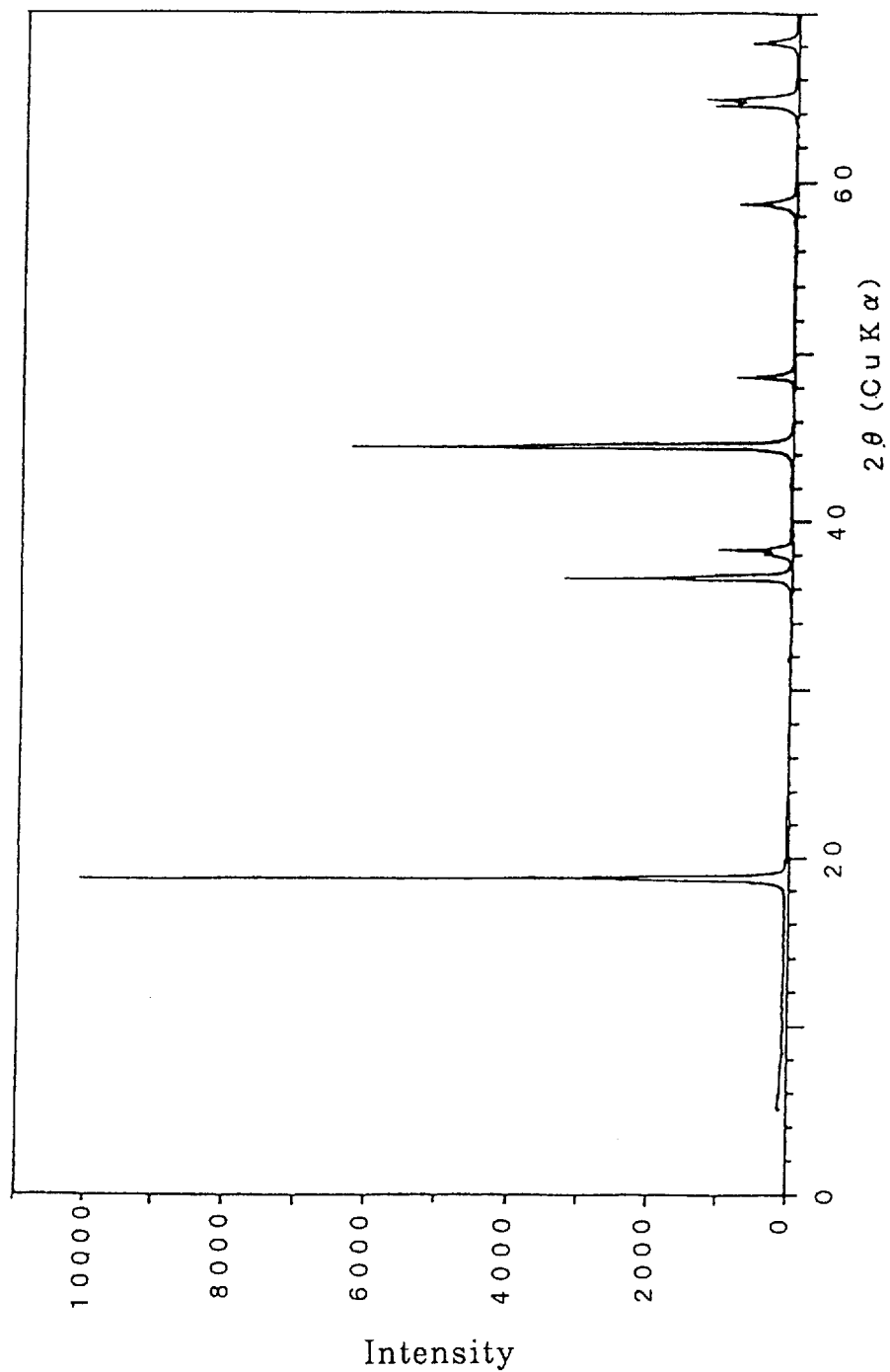
FIG. 13 is an XRD of the complex oxide obtained in Example 10.
Figure 14:
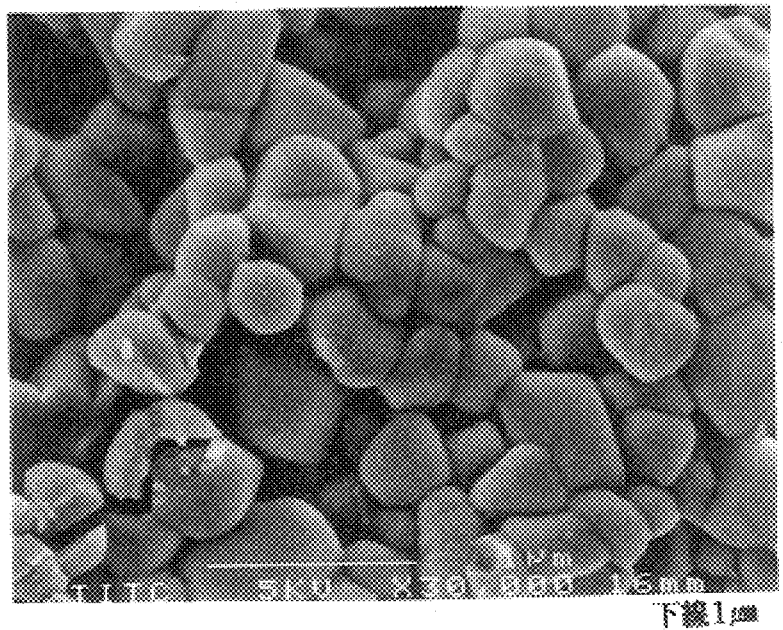
FIG. 14 is a SEM photograph (30,000 magnifications) of the complex oxide obtained in Example 10.
Figure 15:
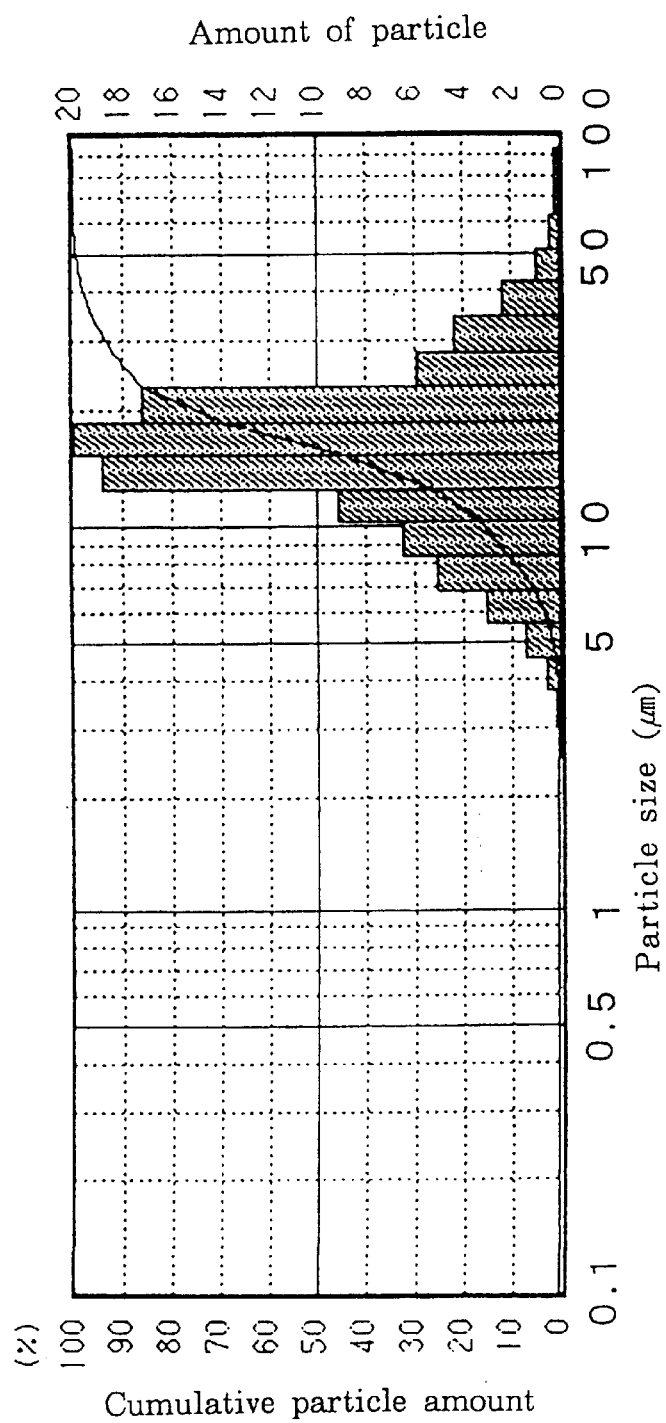
FIG. 15 is a particle size distribution of the complex oxide obtained in Example 10.
Figure 16:
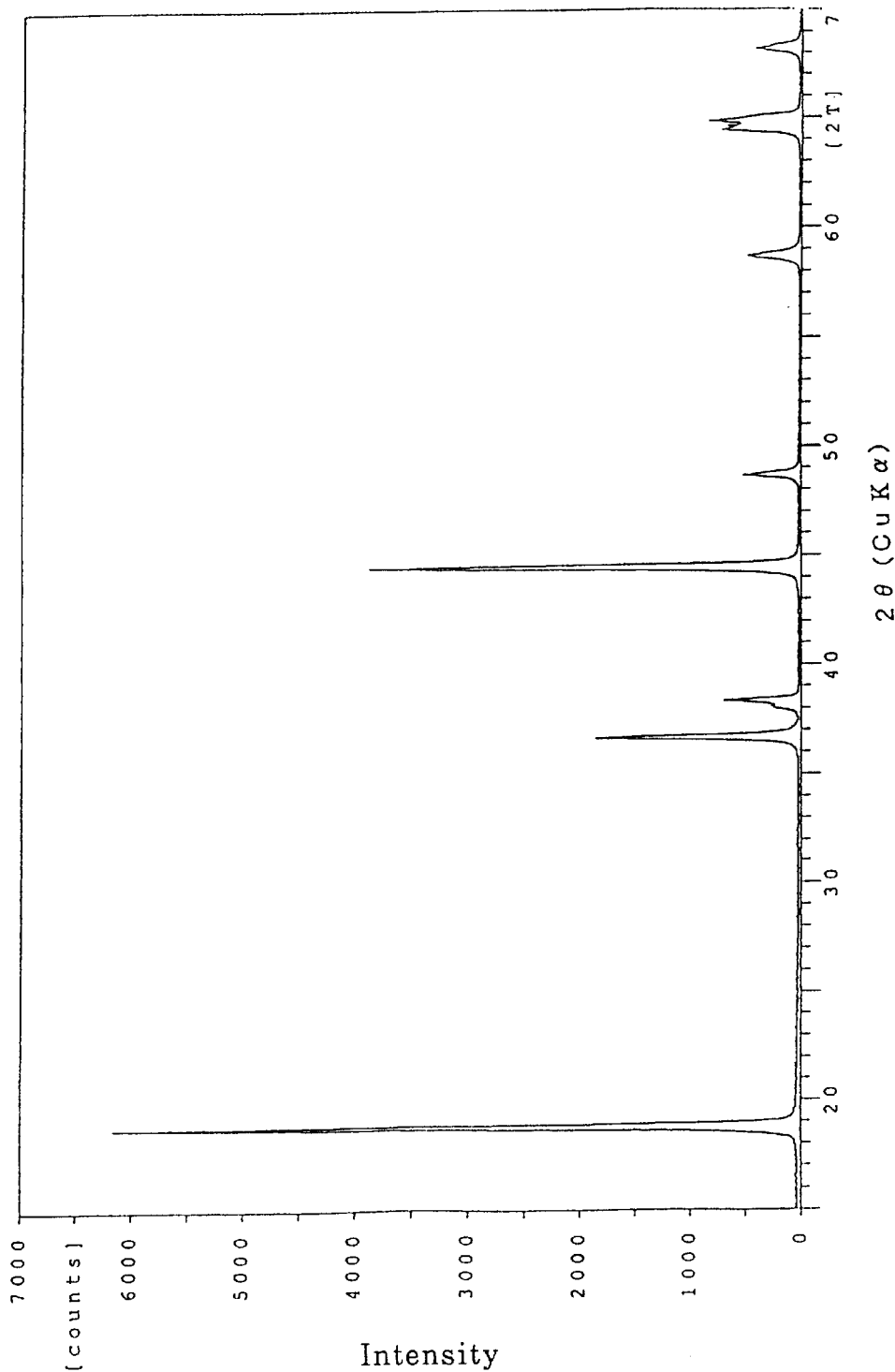
FIG. 16 is an XRD of the complex oxide obtained in Example 13.
Figure 17:
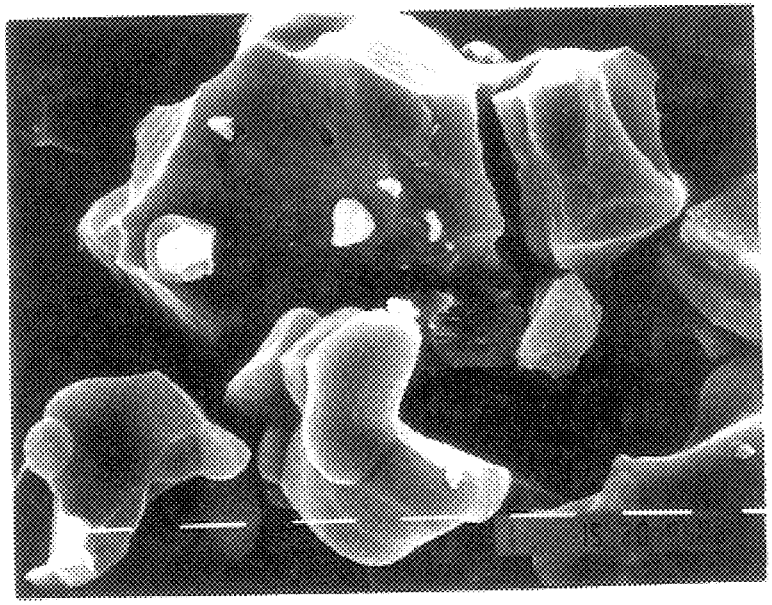
FIG. 17 is a SEM photograph (10,000 magnifications) of the complex oxide obtained in Example 13.
Figure 18:
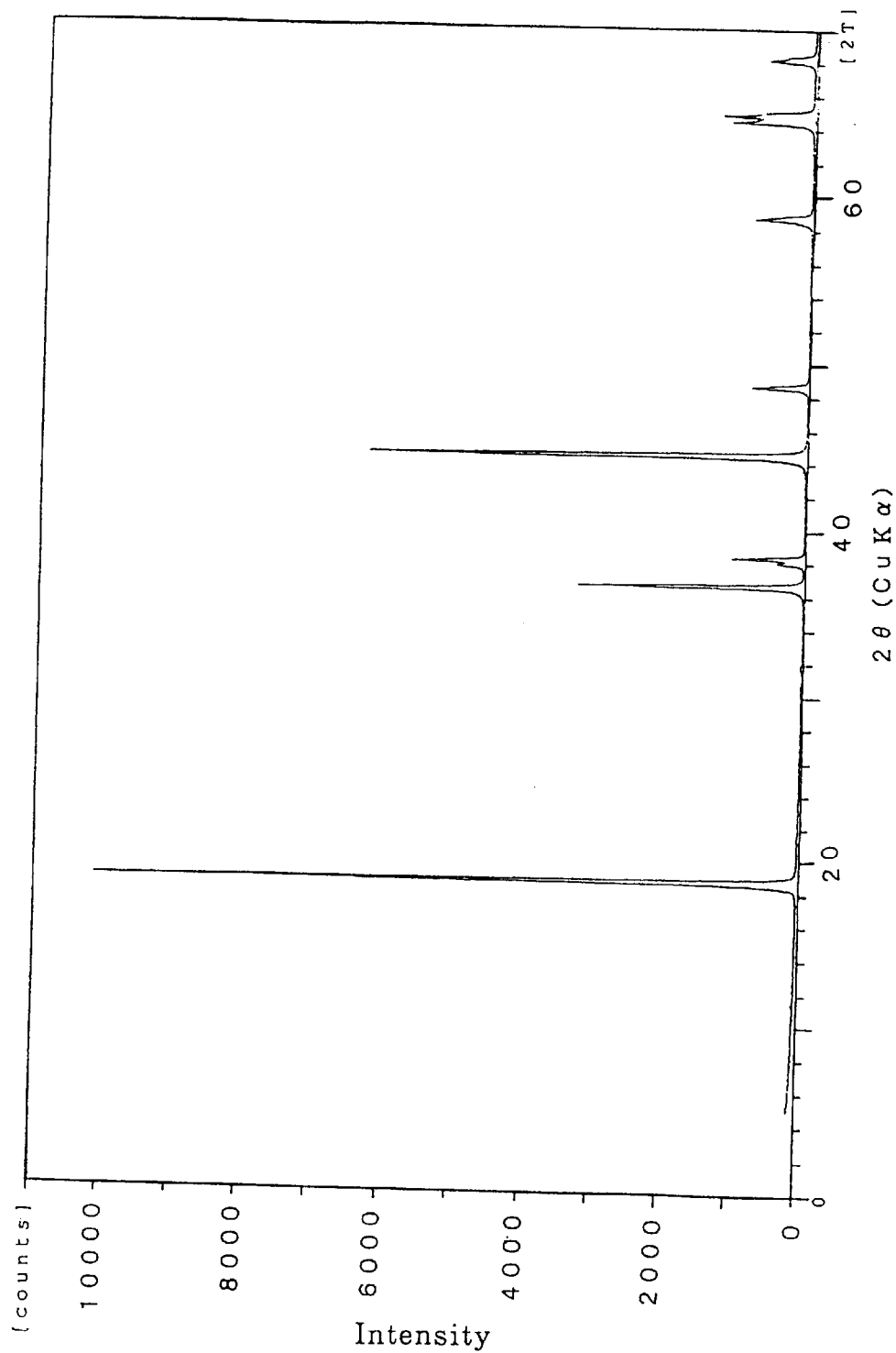
FIG. 18 is an XRD of the complex oxide obtained in Example 14.
Figure 19:
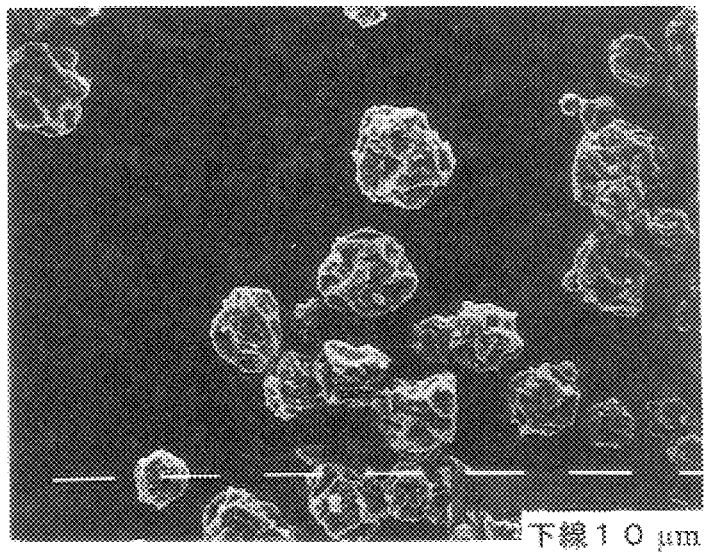
FIG. 19 is a SEM photograph (150 magnifications) of the complex oxide obtained in Example 14.
Figure 20:
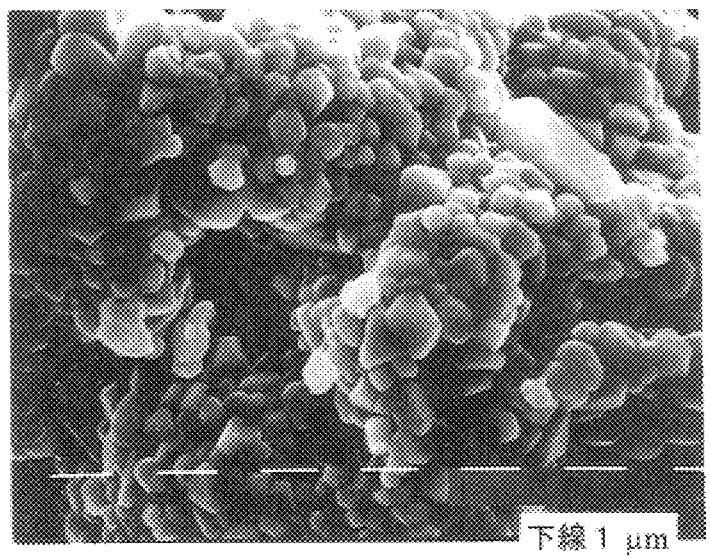
FIG. 20 is a SEM photograph (10,000 magnifications) of the complex oxide obtained in Example 14.
Figure 21:
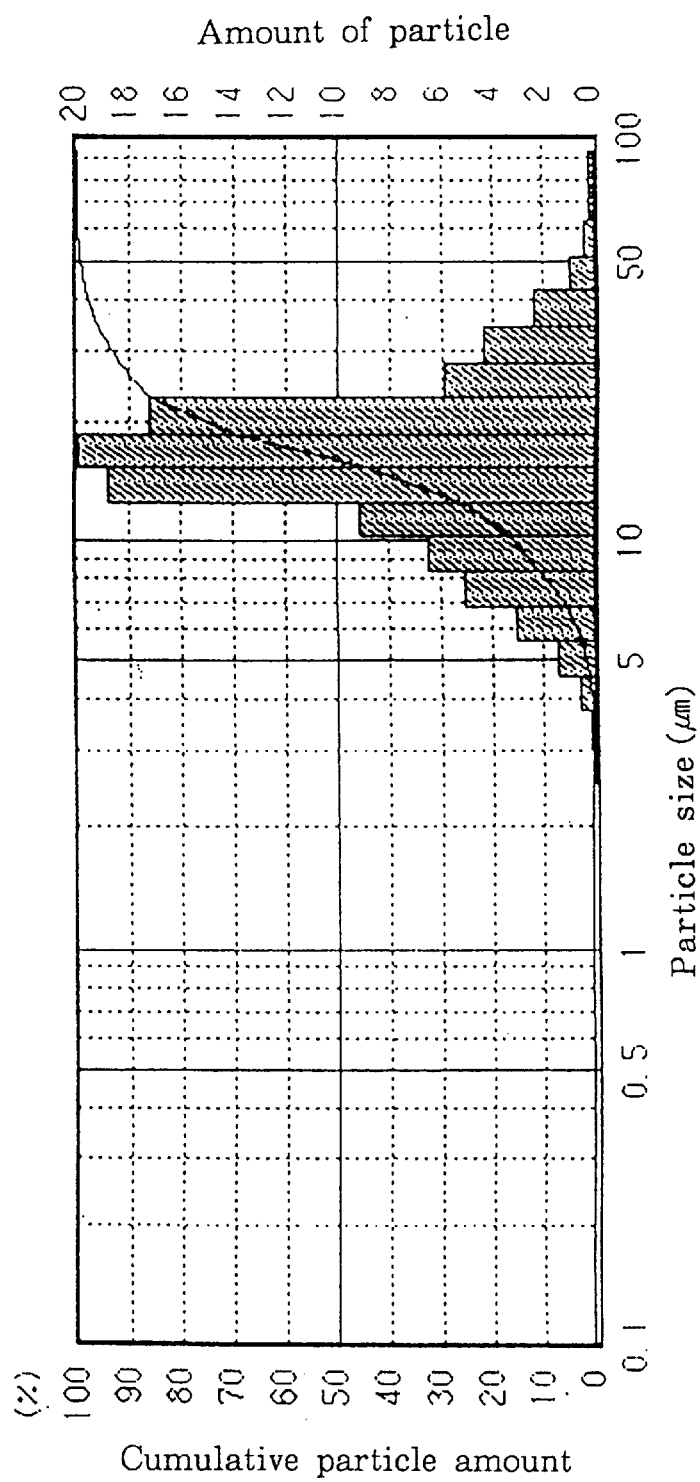
FIG. 21 is a particle size distribution of the complex oxide obtained in Example 14.
Figure 22:
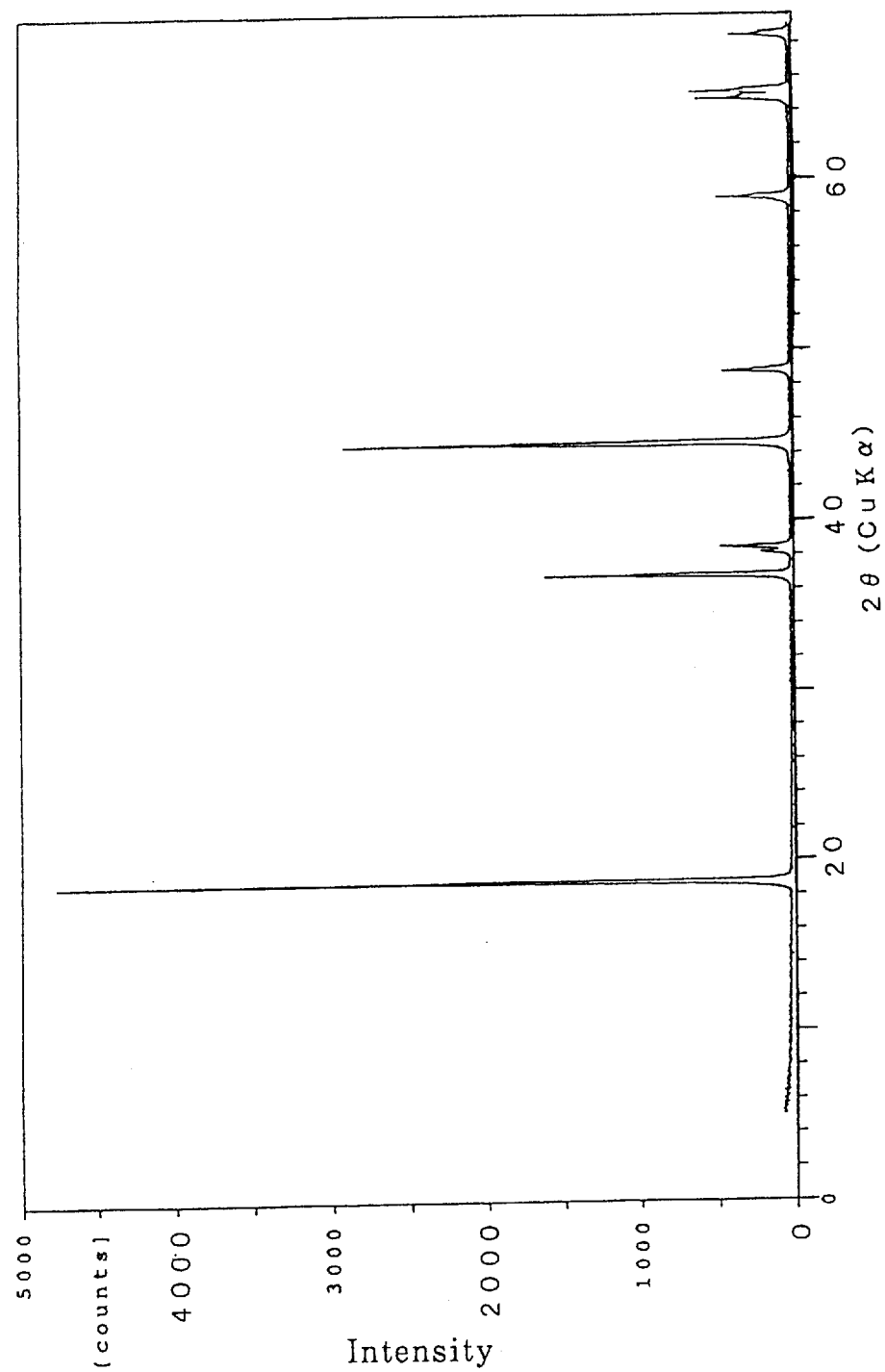
FIG. 22 is an XRD of the complex oxide obtained in Example 16.
Figure 23:
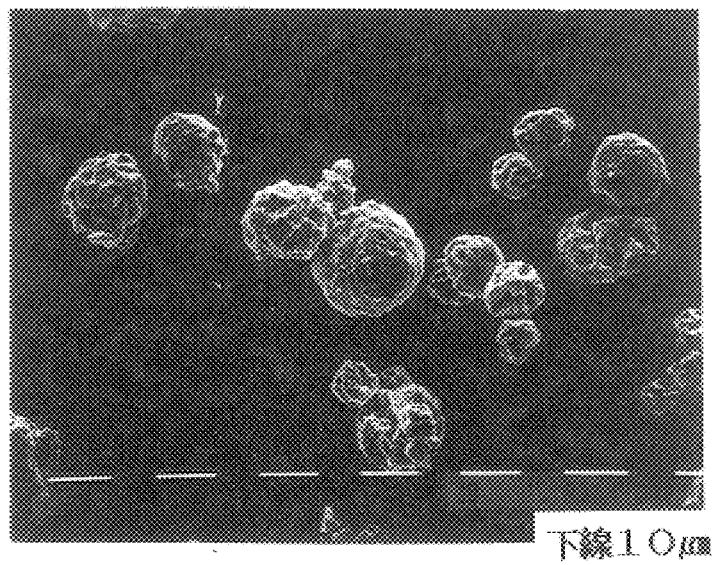
FIG. 23 is a SEM photograph (1,000 magnifications) of the complex oxide obtained in Example 16.
Figure 24:
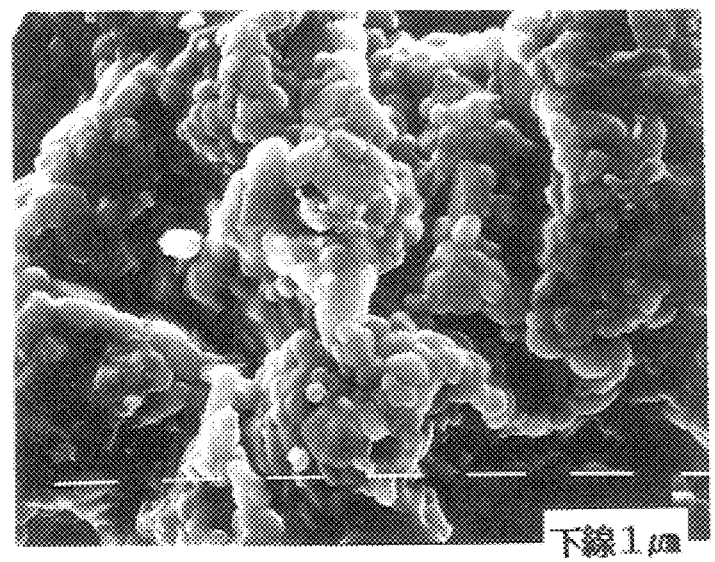
FIG. 24 is a SEM photograph (10,000 magnifications) of the complex oxide obtained in Example 16.
Figure 25:
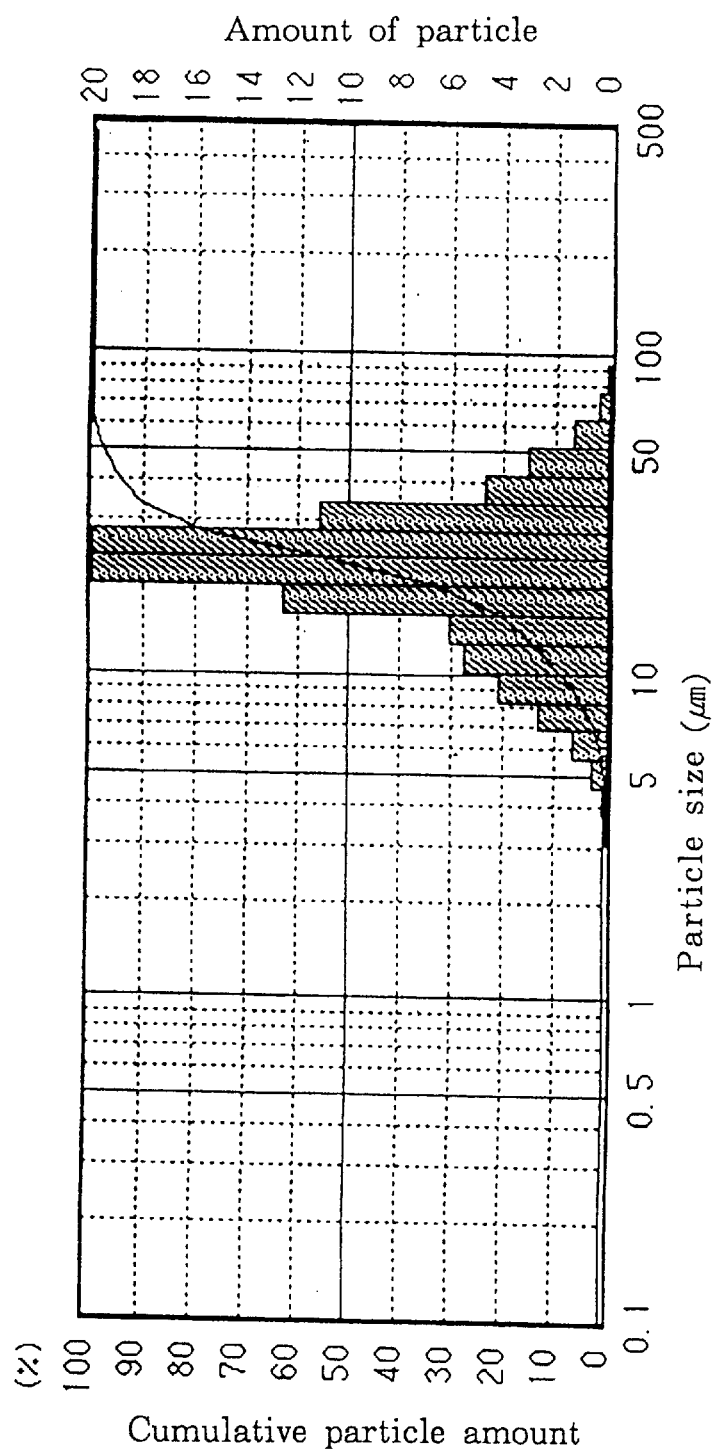
FIG. 25 is a particle size distribution of the complex oxide obtained in Example 16.
Figure 26:
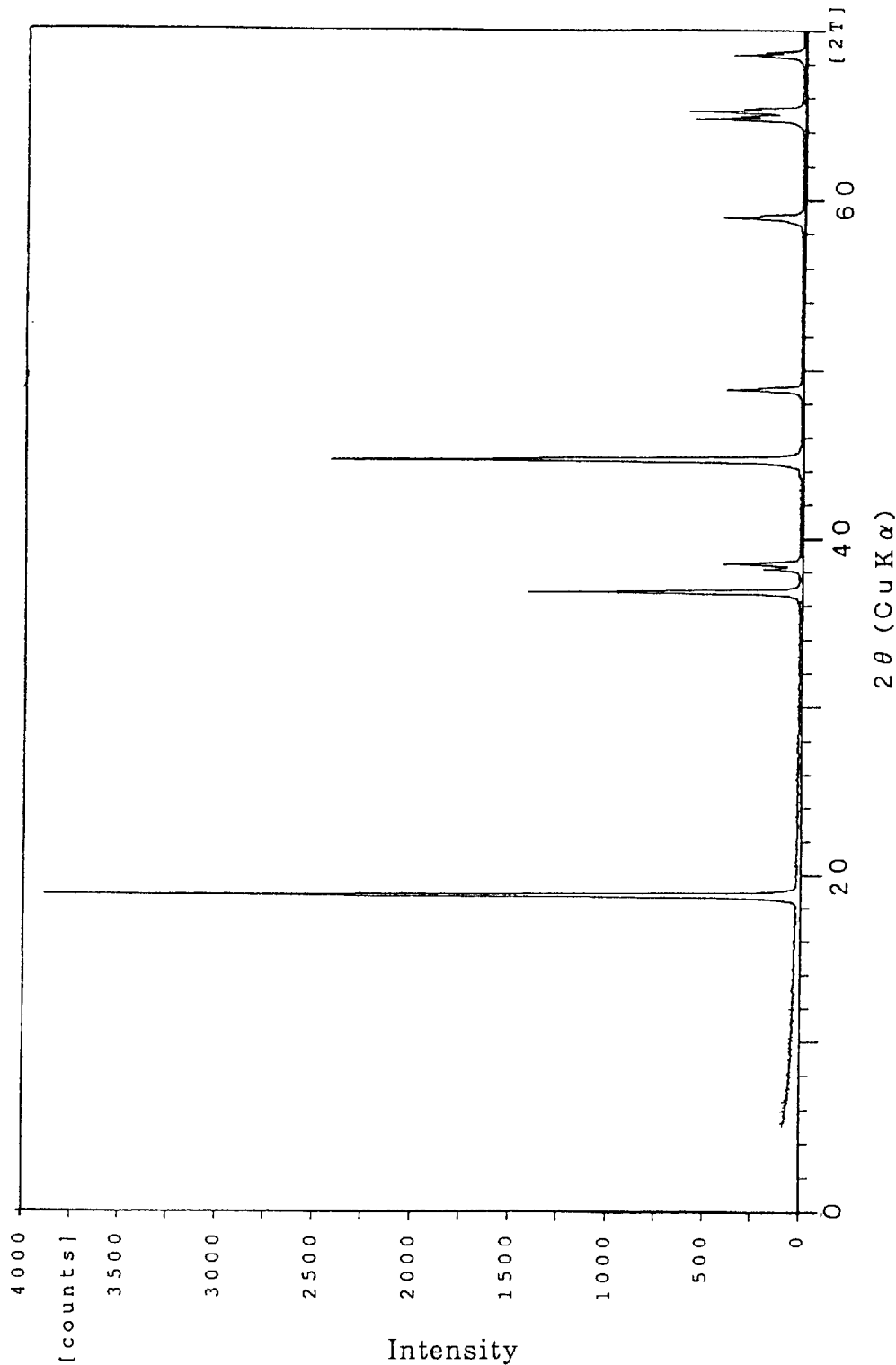
FIG. 26 is an XRD of the complex oxide obtained in Example 19.
Figure 27:
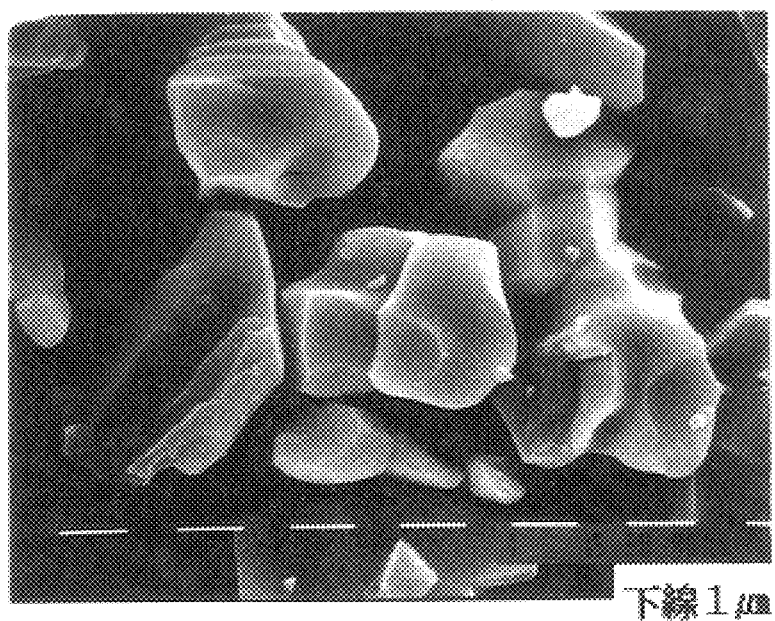
FIG. 27 is a SEM photograph (10,000 magnifications) of the complex oxide obtained in Example 19.
Figure 28:
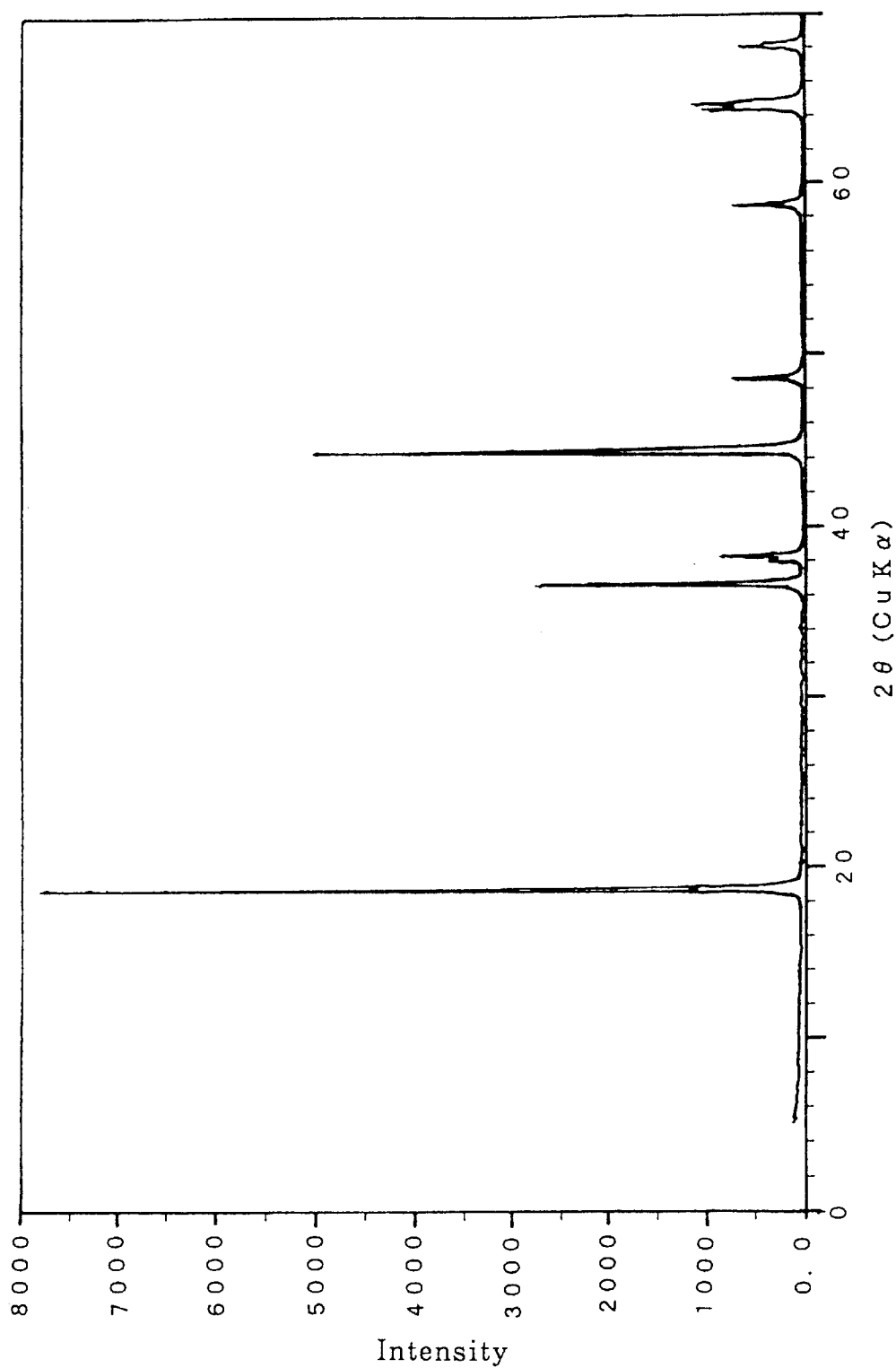
FIG. 28 is an XRD of the complex oxide obtained in Example 21.
Figure 29:
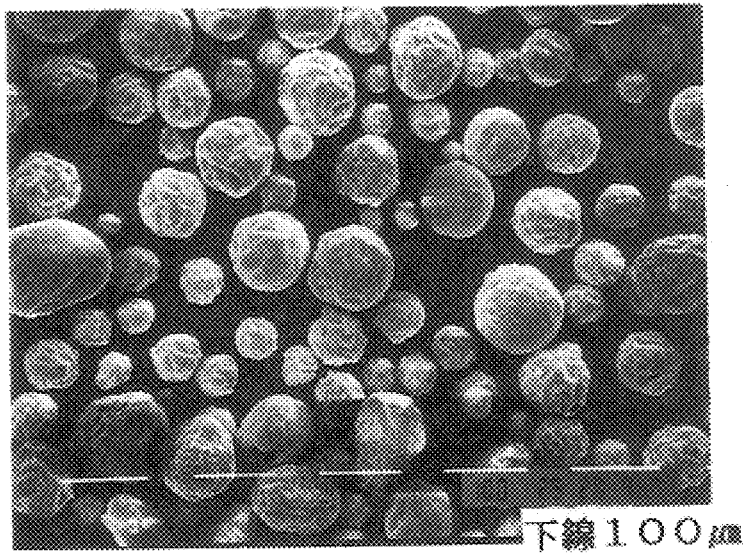
FIG. 29 is a SEM photograph (50 magnifications) of the complex-oxide obtained in Example 21.
Figure 30:
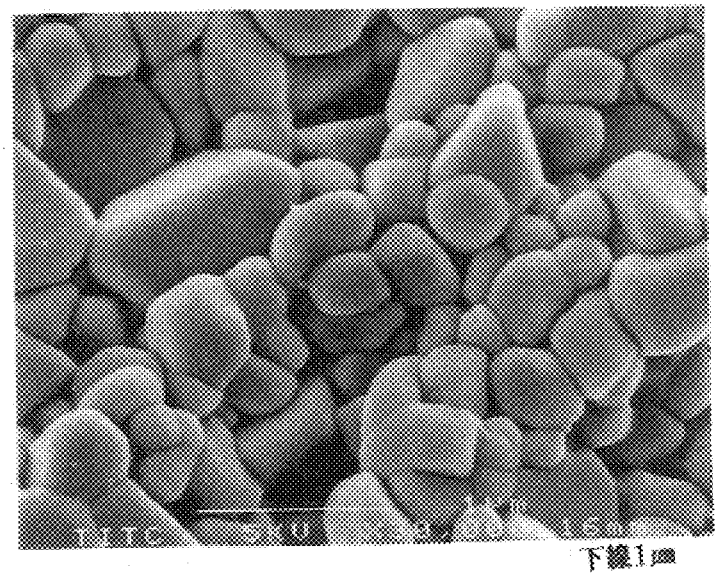
FIG. 30 is a SEM photograph (30,000 magnifications) of the complex oxide obtained in Example 21.
Figure 31:
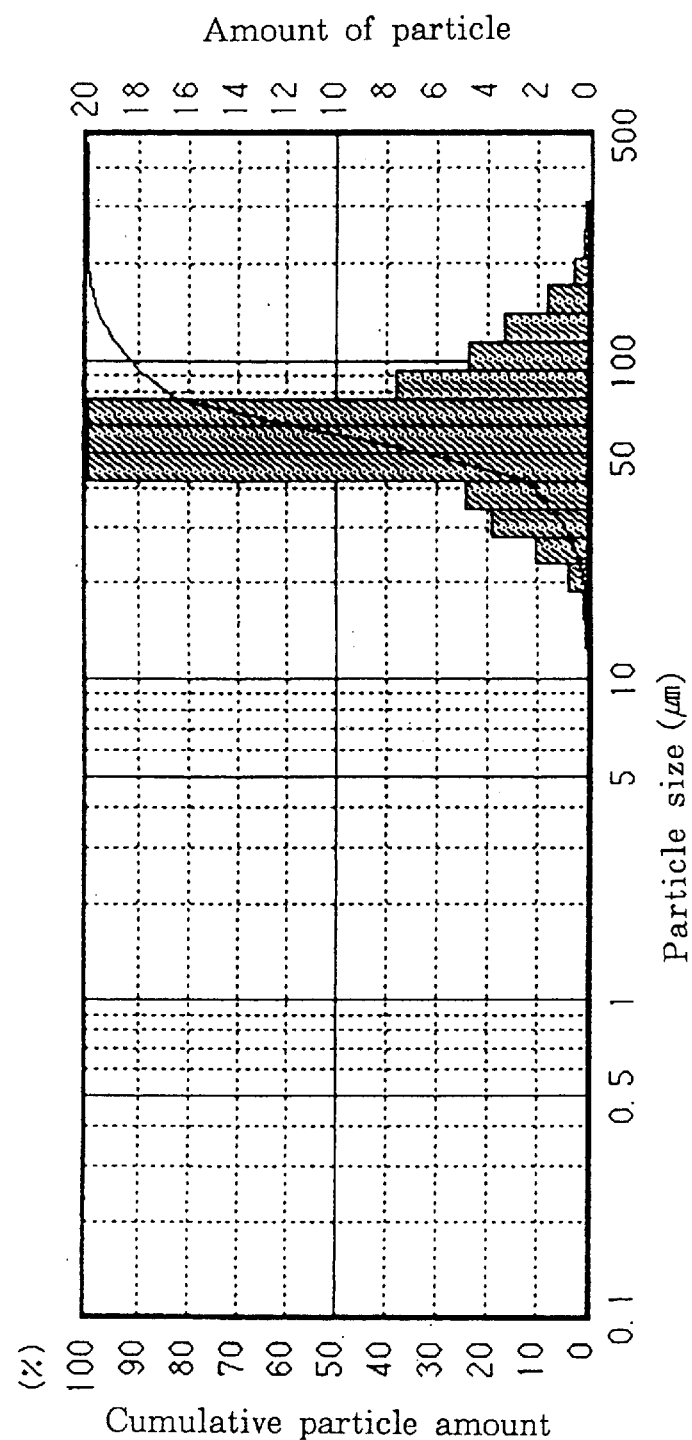
FIG. 31 is a particle size distribution of the complex oxide obtained in Example 21.
Figure 32:
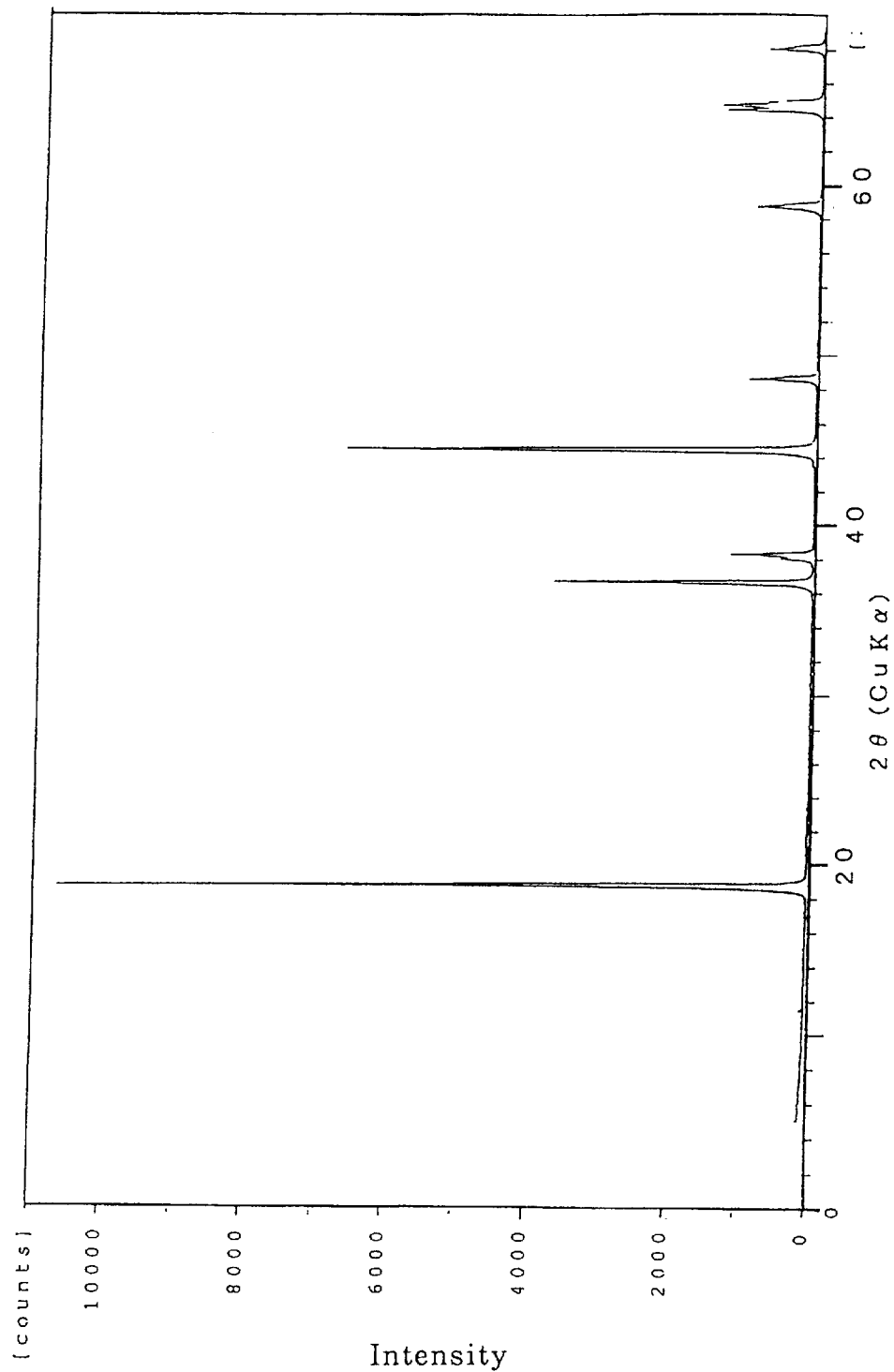
FIG. 32 is an XRD of the complex oxide obtained in Comparative Example 1.
Figure 33:
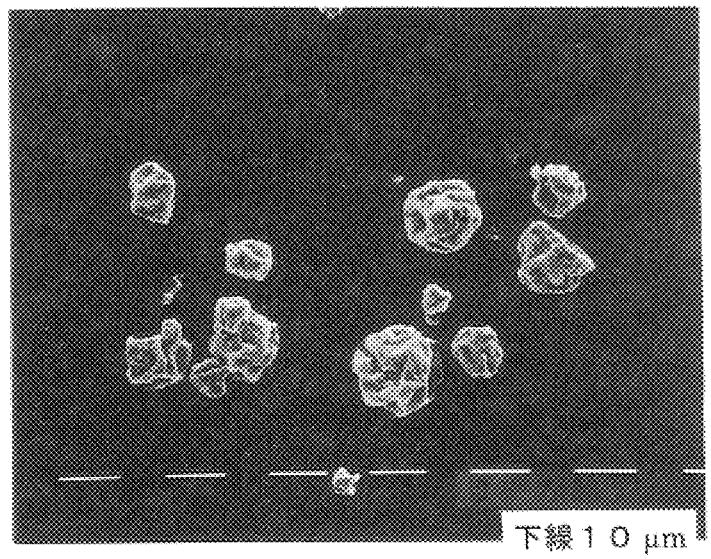
FIG. 33 is a SEM photograph (1,000 magnifications) of the complex oxide obtained in Comparative Example 1.
Figure 34:
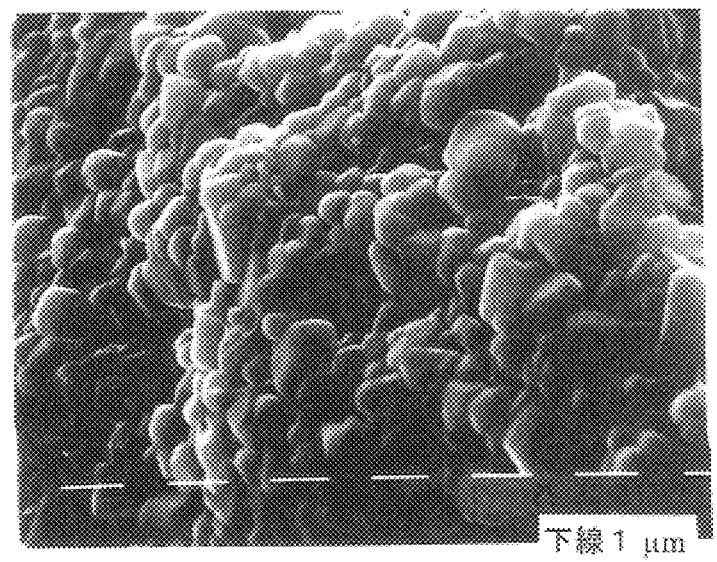
FIG. 34 is a SEM photograph (10,000 magnifications) of the complex oxide obtained in Comparative Example 1.
Figure 35:
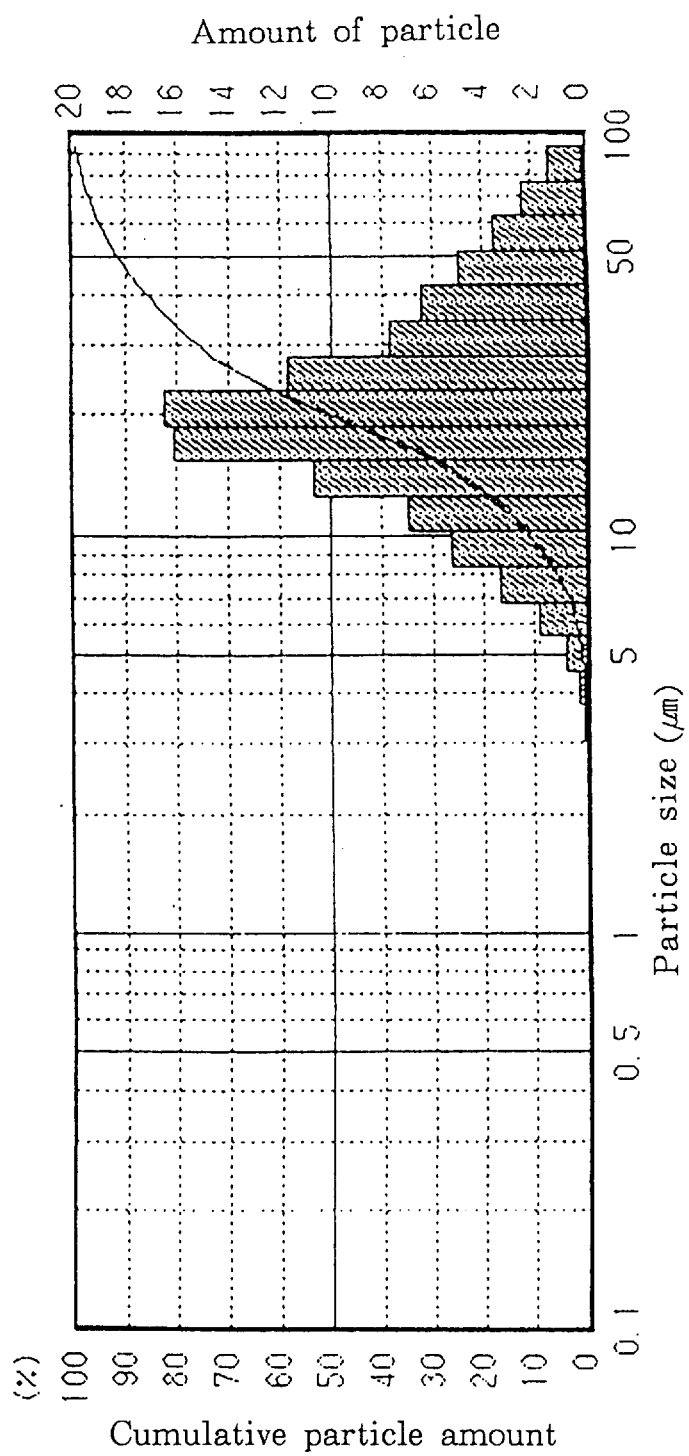
FIG. 35 is a particle size distribution of the complex oxide obtained in Comparative Example 1.
Figure 36:
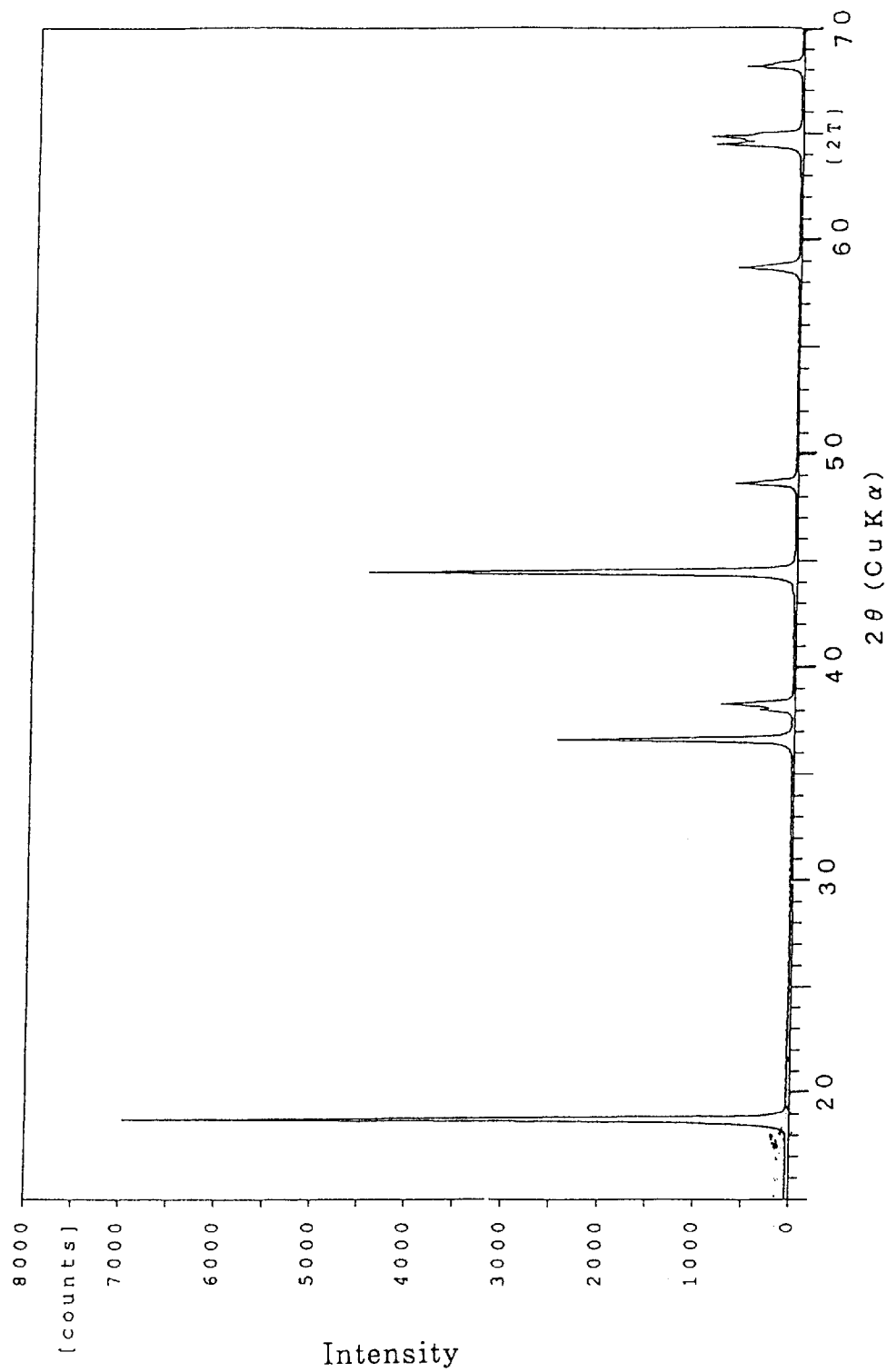
FIG. 36 is an XRD of the complex oxide obtained in Comparative Example 5.
Figure 37:
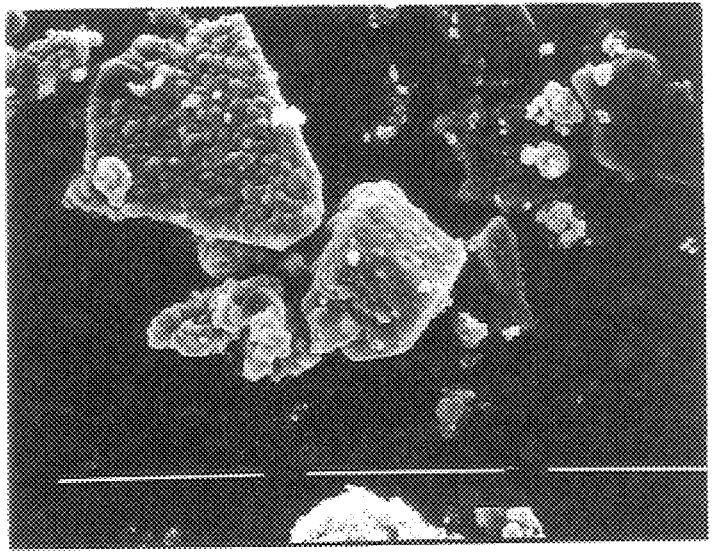
FIG. 37 is a SEM photograph (3,500 magnifications) of the complex oxide obtained in Comparative Example 5.
Figure 38:
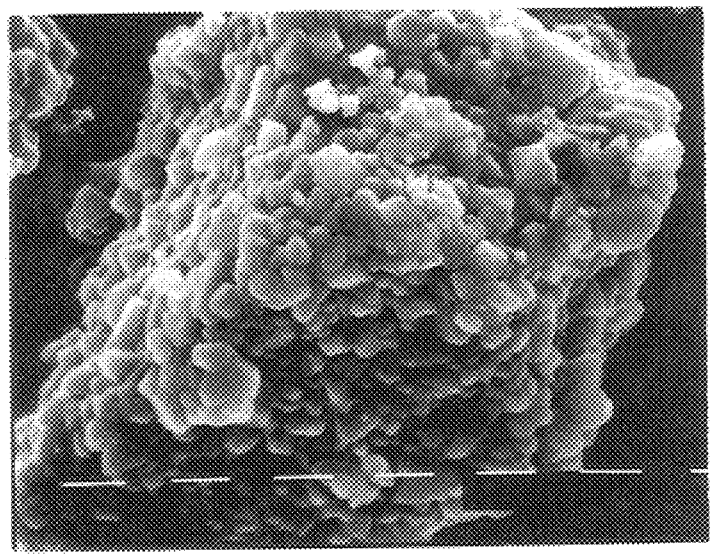
FIG. 38 is a SEM photograph (10,000 magnifications) of the complex oxide obtained in Comparative Example 5.
Figure 39:
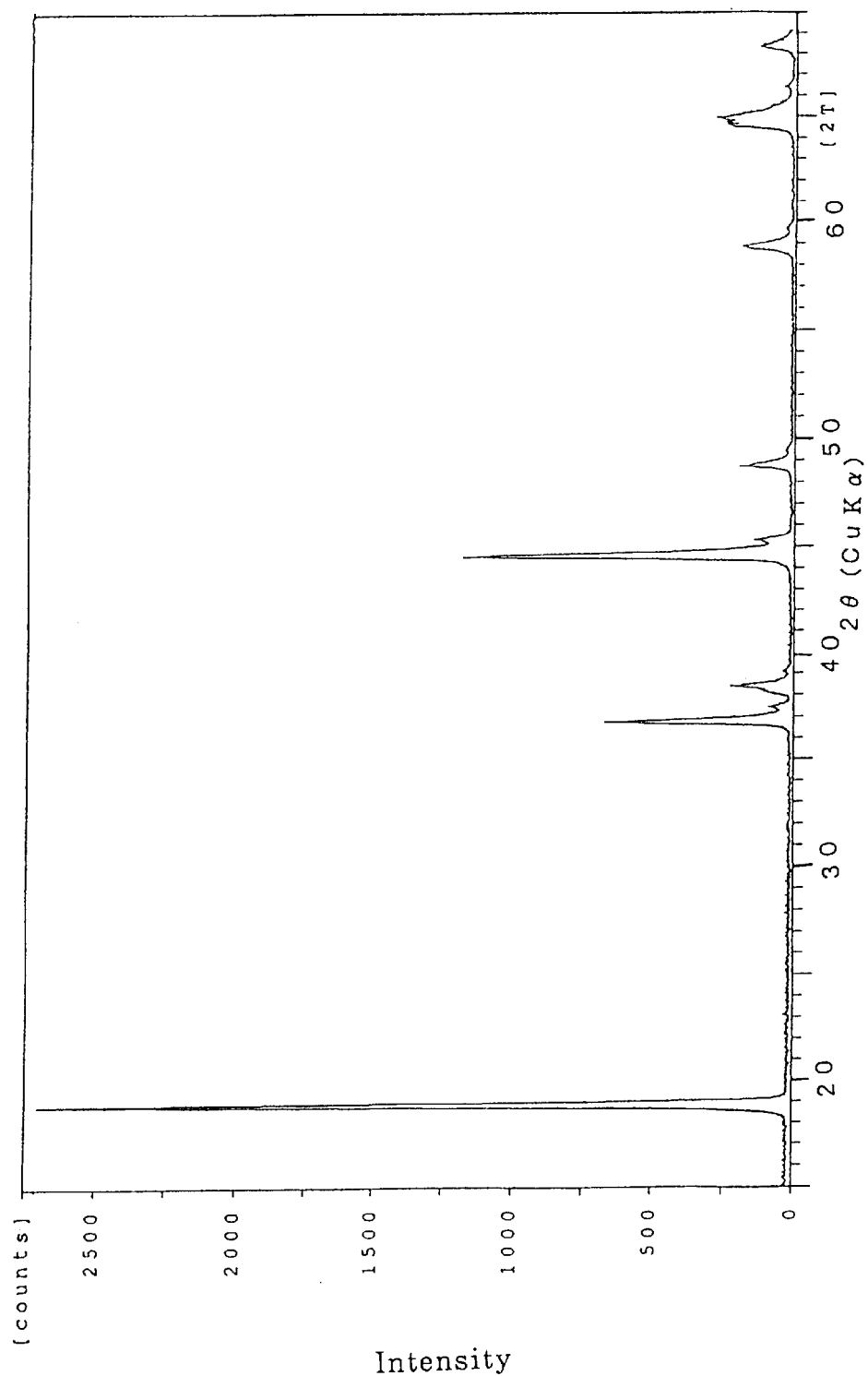
FIG. 39 is an XRD of the complex oxide obtained in Comparative Example 15.
Figure 40:
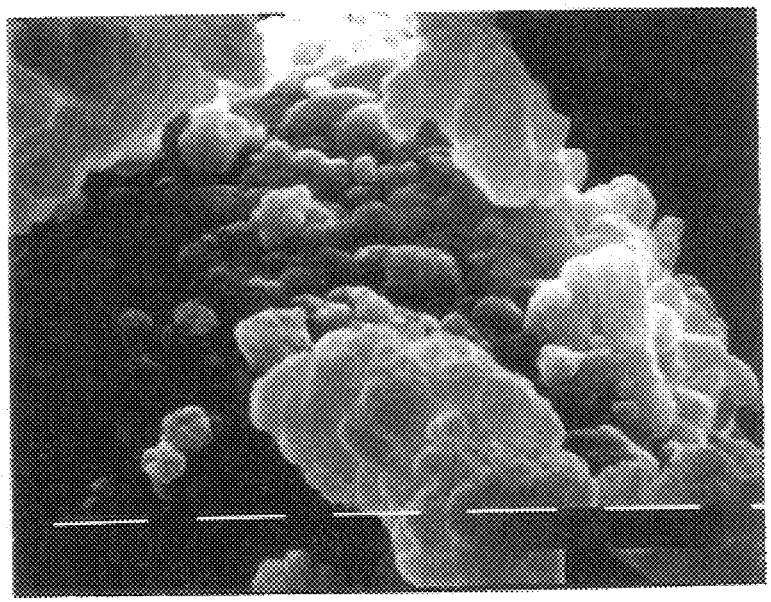
FIG. 40 is a SEM photograph (20,000 magnifications) of the complex oxide obtained in Comparative Example 15.

The present invention is more specifically illustrated by the following examples.

The respective methods for measuring the BET specific surface area, for measuring primary particle size by Scherrer's method and for measuring trivalent nickel carried out with respect to the heat-treated product are as shown below.

[A method for measuring BET specific surface area]

A given amount of the heat-treated product was weighed in a cell as the sample to be employed and degassed by heating under the flow of a mixed gas of 30% nitrogen and 70% helium, and thereafter the specific surface area was measured according to the BET one point continuous flowing method. "MONOSORB" a product of Yuasa Ionics Co., Ltd. was employed as BET specific surface area measuring apparatus.

[Scherrer's method]

It is a method wherein the size of crystallite is calculated by the following equation (1) on the assumption that the width of diffraction pattern is dependent on the size of crystallite alone owing to the uniformity in the size of crystallite and no strain in the crystals.

$$Dhkl=(k\lambda)/(\beta \cos \theta) \quad \text{(Equation 1)}$$

wherein Dhkl (angstrom) represents size of crystallite in vertical direction to the face (hkl), λ(angstrom) the wavelength of X-ray, β (rad) the width of diffraction pattern, θ (°) angle of diffraction, and k a constant.

[A method for measuring $Ni^{3+}$]

$Ni^{3+}$ is expressed as a percentage based on the total Ni. It was measured by oxidation-reduction titration. 0.2 gram of a sample was dissolved in 0.25 M $FeSO_4$-3.6 N $H_2SO_4$ solution, and 2 ml of a concentrated phosphoric acid was added to the solution. The mixture was titrated with a 0.1 N $KMnO_4$ solution. A blank test was carried out in the same manner as in the above. The $Ni^{3+}$ % was calculated by the following equation 2. In the equation 2, f represents the factor of the 0.1 N $KMnO_4$ solution, $X_0$ the titer of the blank test (ml), X the titer of the sample (ml), m the amount of the sample (g), and B the content of Ni (%) and A 5.871.

$$[fX(X_0-X)\times A\times 10]/(m\times B) \quad \text{(Equation 2)}$$

EXAMPLE 1

A mixed aqueous solution of 2.0 mol/l aluminum nitrate and nickel nitrate was prepared wherein the molar ratio of Al/(Ni+Al) was 0.03. This mixed aqueous solution and 2.0 mol/l aqueous sodium hydroxide solution were simultaneously added at 50° C. for about 60 minutes with vigorous stirring while pH was kept at 9.0.

The obtained reaction mixture was filtered, washed with water and suspended in water thereby obtaining a 1 mol/l $Ni_{0.97}Al_{0.03}(OH)_2(NO_3)_{0.03}$ slurry. A 3.5 mol/l aqueous lithium hydroxide solution was added dropwisely to the obtained slurry in an amount such that the atomic ratio of Li/(Ni+Al) was 1.05 with respect to the (Ni+Al) content in the above slurry to effect reaction. Thereafter, the reaction mixture was spray dried. The obtained dry material was put in an alumina boat and heated at 750° C. for 5 hours in an atmosphere of oxygen in a tube furnace.

The chemical composition of the firing product was $Li_{1.03}Ni_{0.97}Al_{0.03}O_2$.

EXAMPLE 2

A mixed aqueous solution of 2.0 mol/l aluminum nitrate and nickel nitrate was prepared wherein the molar ratio of Al (Ni+Al) was 0.02. This mixed aqueous solution and 2.0 mol/l aqueous sodium hydroxide solution were simultaneously added at 50° C. over a period of about 60 minutes with vigorous stirring while pH was kept at 9.5.

The obtained reaction mixture was filtered, washed with water and suspended in water thereby obtaining a 1 mol/l $Ni_{0.98}Al_{0.02}(OH)_2(NO_3)_{0.02}$ slurry. A 3.5 mol/l aqueous lithium hydroxide solution was added dropwisely to the obtained slurry in an amount such that the atomic ratio of Li (Ni+Al) was 1.03 with respect to the (Ni+Al) content in the above slurry to effect reaction. Thereafter, the reaction mixture was spray dried. The obtained dry material was put in an alumina boat and heated at 750° C. for 5 hours in an atmosphere of oxygen in a tube furnace.

The chemical composition of the heat-treated product was $Li_{1.01}Ni_{0.98}Al_{0.02}O_2$.

EXAMPLE 3

A mixed aqueous solution of 2.0 mol/l aluminum nitrate and nickel nitrate was prepared wherein the molar ratio of Al (Ni+Al) was 0.1. This mixed aqueous solution and 1.0 mol/l aqueous sodium hydroxide solution were simultaneously added at 25° C. over a period of about 60 minutes with vigorous stirring while pH was kept at 8.5.

The obtained reaction mixture was filtered, washed with water and suspended in water thereby obtaining a 1 mol/l $Ni_{0.9}Al_{0.1}(OH)_2(NO_3)_{0.1}$ slurry. A 3.5 mol/l aqueous lithium hydroxide solution was added dropwisely to the obtained slurry in an amount such that the atomic ratio of Li/(Ni+Al) was 1.05 with respect to the (Ni+Al) content in the above slurry to effect reaction. Thereafter, the reaction mixture was spray dried. The obtained dry material was put in an alumina boat and heated at 750° C. for 5 hours in an atmosphere of oxygen in a tube furnace.

The chemical composition of the heat-treated product was $LiNi_{0.9}Al_{0.1}O_2$.

EXAMPLE 4

A mixed aqueous solution of 2.0 mol/l aluminum nitrate and nickel nitrate was prepared wherein the molar ratio of Al/(Ni+Al) was 0.2. This mixed aqueous solution and 1.0 mol/l aqueous sodium hydroxide solution were simultaneously added at 25° C. over a period of about 60 minutes with vigorous stirring while pH was kept at 8.5.

The obtained reaction mixture was filtered, washed with water and suspended in water thereby obtaining a 1 mol/l $Ni_{0.8}Al_{0.2}(OH)_2(NO_3)_{0.2}$ slurry. A 3.5 mol/l aqueous lithium hydroxide solution was added dropwisely to the obtained slurry in an amount such that the atomic ratio of Li/(Ni+Al) was 1.05 with respect to the (Ni+Al) content in the above slurry to effect reaction. Thereafter, the reaction mixture was spray dried. The obtained dry material was put in an alumina boat and heated at 750° C. for 5 hours in an atmosphere of oxygen in a tube furnace.

The chemical composition of the heat-treated product was $Li_{1.01}Ni_{0.8}Al_{0.2}O_2$.

EXAMPLE 5

The spray dried product obtained in Example 3 was pressed into a shape under a static pressure of 1,000 kg/cm$^2$ using Brinell hardness tester. The shaped form was put in an alumina boat and fired at 750° C. for 72 hours in an atmosphere of oxygen in a tube furnace. After cooling, the heat-treated product was pulverized to obtain powdery $LiNi_{0.9}Al_{0.1}O_2$.

EXAMPLE 6

A mixed aqueous solution of 2.0 mol/l ferric nitrate and nickel nitrate was prepared wherein the molar ratio of Fe/(Ni+Fe) was 0.03. This mixed aqueous solution and 2.0 mol/l aqueous sodium hydroxide solution were simultaneously added at 50° C. over a period of about 60 minutes with vigorous stirring while pH was kept at 9.5.

The obtained reaction mixture was filtered, washed with water and suspended in water thereby obtaining a 1 mol/l $Ni_{0.97}Fe_{0.03}(OH)_2(NO_3)_{0.03}$ slurry. A 3.5 mol/l aqueous lithium hydroxide solution was added dropwisely to the obtained slurry in an amount such that the atomic ratio of Li/(Ni+Fe) was 1.03 with respect to the (Ni+Fe) content in the above slurry to effect reaction. Thereafter, the reaction mixture was spray dried. The obtained dry material was put in a alumina boat and heated at 750° C. for 5 hours in an atmosphere of oxygen in a tube furnace.

The chemical composition of the heat-treated product was Li, $Li_{1.02}Ni_{0.97}Fe_{0.03}O_2$.

EXAMPLE 7

A mixed aqueous solution of 2.0 mol/l ferric nitrate and nickel nitrate was prepared wherein the molar ratio of Fe/(Ni+Fe) was 0.1. This mixed aqueous solution and 1.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/ $Ni_{0.9}Fe_{0.1}(OH)_2(NO_3)_{0.1}$ slurry. A 3.0 mol/l aqueous lithium hydroxide solution was added dropwisely to the obtained slurry in an amount such that the atomic ratio of Li/(Ni+Fe) was 1.05 with respect to the Ni content in the above slurry to effect reaction. Thereafter, the reaction mixture was spray dried. The obtained dry material was put in a alumina boat and heated at 750° C. for 5 hours in an atmosphere of oxygen in a tube furnace.

The chemical composition of the heat-treated product was $LiNi_{0.9}Fe_{0.1}O_2$.

EXAMPLE 8

A mixed aqueous solution of 2.0 mol/l ferric nitrate and nickel nitrate was prepared wherein the molar ratio of Fe/(Ni+Fe) was 0.2. This mixed aqueous solution and 1.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/l $Ni_{0.8}Fe_{0.2}(OH)_2(NO_3)_{0.2}$ slurry. A 3.0 mol/l aqueous lithium hydroxide solution was added dropwisely to the obtained slurry in an amount such that the atomic ratio of Li/(Ni+Fe) was 1.05 with respect to the Ni content in the above slurry to effect reaction. Thereafter, the reaction mixture was spray dried. The obtained dry material was put in a alumina boat and heated at 750° C. for 5 hours in an atmosphere of oxygen in a tube furnace.

The chemical composition of the heat-treated product was $LiNi_{0.8}Fe_{0.2}O_2$.

EXAMPLE 9

The spray dried product obtained in Example 7 was pressed into a shape under a static pressure of 1,000 kg/cm$^2$ using Brinell hardness tester. The shaped form was put in an alumina boat and heated at 750° C. for 20 hours in an atmosphere of oxygen in a tube furnace. After cooling, the heat-treated product was pulverized to obtain powdery $LiNi_{0.9}Fe_{0.1}O_2$.

EXAMPLE 10

A mixed aqueous solution of 1.0 mol/l manganese nitrate and nickel nitrate wherein the molar ratio of Mn/(Ni+Mn)

was 0.03. This mixed aqueous solution and 1.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/l $Ni_{0.97}Mn_{0.03}(OH)_{1.97}(NO_3)_{0.03}$ slurry (this basic nitrate salt was dried, had a BET specific surface area of 147.18 $m^2/g$ and a primary particle size (crystal lattice) of 44.1 angstroms as the value calculated by Scherrer's method from the half value width of the peak appeared at near $2\theta=60°$ of XRD). A 3.0 mol/l aqueous lithium hydroxide solution was added dropwisely to the obtained slurry in an amount such that the atomic ratio of Li/(Ni+Mn) was 1.05 with respect to the Ni content in the above suspension to effect reaction. Thereafter, the reaction mixture was spray dried. The obtained dry material was put in an alumina boat and heated at 750° C. for 5 hours in an atmosphere of oxygen in a tube furnace and pulverized in a mortar to obtain powdery $LiNi_{0.97}Mn_{0.03}O_2$.

EXAMPLE 11

A mixed aqueous solution of 1.0 mol/l manganese nitrate and nickel nitrate wherein the molar ratio of Mn/(Ni+Mn) was 0.1. This mixed aqueous solution and 1.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/l $Ni_{0.9}Mn_{0.1}(OH)_{1.9}(NO_3)_{0.1}$ slurry. A 3.0 mol/l aqueous lithium hydroxide solution was added dropwisely to the obtained slurry in an amount such that the atomic ratio of Li/(Ni+Mn) was 1.05 with respect to the Ni content in the above slurry to effect reaction. Thereafter, the reaction mixture was spray dried. The obtained dry material was put in an alumina boat and heated at 750° C. for 5 hours in an atmosphere of oxygen in a tube furnace.

The chemical composition of the heat-treated product was $LiNi_{0.9}Mn_{0.1}O_2$.

EXAMPLE 12

A mixed aqueous solution of 1.0 mol/l manganese nitrate and nickel nitrate was prepared wherein the molar ratio of Mn/(Ni+Mn) was 0.4. This mixed aqueous solution and 1.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/l $Ni_{0.7}Mn_{0.4}(OH)_{1.97}(NO_3)_{0.3}$ slurry. A 3.0 mol/l aqueous lithium hydroxide solution was added dropwisely to the obtained slurry in an amount such that the atomic ratio of Li/(Ni+Mn) was 1.05 with respect to the Ni content in the above slurry to effect reaction. Thereafter, the reaction mixture was spray dried. The obtained dry material was put in an alumina boat and heated at 750° C. for 5 hours in an atmosphere of oxygen in a tube furnace.

The chemical composition of the heat-treated product (powder) was $LiNi_{0.6}Mn_{0.4}O_2$.

EXAMPLE 13

The spray dried product obtained in Example 11 was pressed into a shape under a static pressure of 1,000 $kg/cm^2$ using Brinell hardness tester. The shaped form was put in an alumina boat and heated at 750° C. for 20 hours in an atmosphere of oxygen in a tube furnace. After cooling, the heat-treated product was pulverized to obtain powdery $LiNi_{0.9}Mn_{0.1}O_2$.

EXAMPLE 14

A mixed aqueous solution of 2.0 mol/l cobalt nitrate and nickel nitrate was prepared wherein the molar ratio of Co/(Ni+Co) was 0.03. This mixed aqueous solution and 2.0 mol/l aqueous sodium hydroxide solution were simultaneously added at 40° C. over a period of about 60 minutes with vigorous stirring while pH was kept at 9.0.

The obtained reaction mixture was filtered, washed with water and suspended in water thereby obtaining a 1 mol/l $Ni_{0.97}Co_{0.03}(OH)_2(NO_3)_{0.03}$ slurry. A 3.5 mol/l aqueous lithium hydroxide solution was added dropwisely to the obtained slurry in an amount such that the atomic ratio of Li/(Ni+Co) was 1.05 with respect to the (Ni+Co) content in the above slurry to effect reaction. Thereafter, the reaction mixture was spray dried. The obtained dry material was put in an alumina boat and heated at 750° C. for 5 hours in an atmosphere of oxygen in a tube furnace.

The chemical composition of the heat-treated product was $Li_{1.03}Ni_{0.97}Co_{0.03}O_2$.

EXAMPLE 15

A mixed aqueous solution of 1.0 mol/l cobalt nitrate and nickel nitrate was prepared wherein the molar ratio of Co/(Ni+CO) was 0.1. This mixed aqueous solution and 2.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/l $Ni_{0.9}Co_{0.1}(OH)_{1.9}(NO_3)_{0.1}$ slurry. A 3.0 mol/l aqueous lithium hydroxide solution was added dropwisely to the obtained slurry in an amount such that the atomic ratio of Li (Ni+Co) was 1.05 with respect to the Ni content in the above suspension to effect reaction. Thereafter, the reaction mixture was spray dried. The obtained dry material was put in an alumina boat and heated at 750° C. for 5 hours in an atmosphere of oxygen in a tube furnace to obtain powdery $LiNi_{0.9}Co_{0.1}O_2$.

EXAMPLE 16

A mixed aqueous solution of 1.0 mol/l cobalt nitrate and nickel nitrate wherein the molar ratio of Co/(Ni+Co) was 0.2. This mixed aqueous solution and 1.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/l $Ni_{0.8}CO_{0.2}(OH)_{1.9}(NO_3)_{0.2}$ slurry. A 3.0 mol/l aqueous lithium hydroxide solution was added dropwisely to the obtained slurry in an amount such that the atomic ratio of Li/(Ni+Co) was 1.05 with respect to the Ni content in the above slurry to effect reaction. Thereafter, the reaction mixture was spray dried. The obtained dry material was put in an alumina boat and heated at 750° C. for 5 hours in an atmosphere of oxygen in a tube furnace to obtain powdery $LiNi_{0.8}CO_{0.2}O_2$.

EXAMPLE 17

A mixed aqueous solution of 1.0 mol/cobalt nitrate and nickel nitrate was prepared wherein the molar ratio of Co/(Ni+Co) was 0.3. This mixed aqueous solution and 1.0 mol/l aqueous sodium hydroxide solution were simultaneously added at 25° C. with vigorous stirring while pH was kept at 8.5.

The obtained precipitate was filtered out, washed with water and suspended in water thereby obtaining a 1 mol/l $Ni_{0.7}Co_{0.3}(OH)_{1.7}(NO_3)_{0.3}$ slurry. A 3.0 mol/l aqueous lithium hydroxide solution was added dropwisely to the obtained slurry in an amount such that the atomic ratio of Li/(Ni+Co) was 1.05 with respect to the Ni content in the above slurry to effect reaction. Thereafter, the reaction mixture was spray dried. The obtained dry material was put in an alumina boat and heated at 750° C. for 5 hours in an atmosphere of oxygen in a tube furnace to obtain powdery $LiNi_{0.7}Co_{0.3}O_2$.

EXAMPLE 18

A mixed aqueous solution of 1.0 mol/l cobalt nitrate and nickel nitrate was prepared wherein the molar ratio of Co/(Ni+Co) was 0.4. This mixed aqueous solution and 1.0 mol/l aqueous sodium hydroxide solution were simultaneously added at 25° C. with vigorous stirring while pH was kept at 8.5.

The obtained precipitate was filtered out, washed with water and suspended in water thereby obtaining a 1 mol/l $Ni_{0.6}Co_{0.4}(OH)_{1.7}(NO_3)_{0.3}$ slurry. A 3.0 mol/ aqueous lithium hydroxide solution was added dropwisely to the obtained slurry in an amount such that the atomic ratio of Li/(Ni+Co) was 1.05 with respect to the Ni content in the above slurry to effect reaction. Thereafter, the reaction mixture was spray dried. The obtained dry material was put in an alumina boat and heated at 750° C. for 5 hours in an atmosphere of oxygen in a tube furnace to obtain powdery $LiNi_{0.6}Co_{0.4}O_2$.

EXAMPLE 19

A mixed aqueous solution of 1.0 mol/l cobalt nitrate and nickel nitrate was prepared wherein the molar ratio of Co/(Ni+Co) was 0.2. This mixed aqueous solution and 1.0 mol/l aqueous sodium hydroxide solution were simultaneously added at 25° C. with vigorous stirring while pH was kept at 11.5.

The obtained precipitate was filtered out, washed with water and suspended in water thereby obtaining a 1 mol/l $Ni_{0.8}CO_{0.2}(OH)_{1.7}(NO_3)_{0.3}$ slurry. A 3.0 mol/l aqueous lithium hydroxide solution was added dropwisely to the obtained slurry in an amount such that the atomic ratio of Li/(Ni+Co) was 1.05 with respect to the Ni content in the above slurry to effect reaction. Thereafter, the reaction mixture was spray dried. The obtained spray-dried product was pressed into a shape under a static pressure of 1,300 kg/cm² Brinell hardness tester. The shaped form was put in an alumina boat and heated at 750° C. for 72 hours in an atmosphere of oxygen in a tube furnace. After cooling, the heat-treated product was pulverized to obtain powdery $LiNi_{0.8}Co_{0.2}O_2$.

EXAMPLE 20

The spray dried product obtained in Example 15 was pressed into a shape under a static pressure of 1,000 kg/cm² using Brinell hardness tester. The shaped form was put in an alumina boat and heated at 750° C. for 20 hours in an atmosphere of oxygen in a tube furnace. After cooling, the heat-treated product was pulverized to obtain powdery $LiNi_{0.9}CO_{0.1}O_2$.

EXAMPLE 21

A mixed aqueous solution of 1.0 mol/l magnesium nitrate and nickel nitrate was prepared wherein the molar ratio of Mg/(Ni+Mg) was 0.049. This mixed aqueous solution and 1.0 mol/l aqueous sodium hydroxide solution were simultaneously added at 25° C. with vigorous stirring while pH was kept at 11.0.

The obtained reaction mixture was filtered, washed with water and suspended in water thereby obtaining a 1 mol/l $Ni_{0.951}Mg_{0.049}(OH)_{1.7}(NO_3)_{0.3}$ slurry. (The BET specific surface area of the dried basic nitrate salt was 169.4 m²/g and its primary particle size (crystal lattice) was 32.3 angstroms as the value calculated by the Scherrer's method from the half value width of the peak appeared at near $2\theta=60°$ of XRD). A 3.0 mol/l aqueous lithium hydroxide solution was added dropwisely to the obtained slurry in an amount such that the atomic ratio of Li/(Ni+Mg) was 1.0 with respect to the Ni content in the above slurry to effect reaction. Thereafter, the reaction mixture was spray dried. The spray dried material was put in an alumina boat, heated at 750° C. for 5 hours in an atmosphere of oxygen in a tube furnace and pulverized in a mortar to obtain powdery $LiNi_{0.97}Mg_{0.05}O_2$.

EXAMPLE 22

The spray dried product obtained in Example 15 was put in an alumina boat and heated at 750° C. for 5 hours in an atmosphere of oxygen. After cooling, the firing product was pulverized and pressed into a shape under a static pressure of 1,300 kg/cm² using Brinell hardness tester. The press shaped form was once more put in an alumina, boat and heated at 800° C. for 1 hour in an atmosphere of oxygen in a tube furnace. After cooling, the heat-treated product was pulverized to obtain powdery $LiNi_{0.9}Co_{0.1}O_2$.

Comparative Example 1

1,900 ml of 1.0 mol/l aqueous sodium hydroxide solution was added under stirring to 500 ml of 2.0 mol/l aqueous nickel nitrate solution, thus the molar ratio of Na/Ni being 1.9. The resultant reaction mixture was filtered, washed with water and suspended in water, thereby obtaining 1 mol/l $Ni(OH)_{0.97}(NO_3)_{0.03}$ slurry. A 3.5 mol/l aqueous lithium hydroxide solution was added dropwisely in an amount such that the atomic ratio of Li/Ni was 1.05 with respect to the Ni content in the slurry to effect a reaction. Thereafter, the reaction mixture was spray dried. The obtained dried gel was put in an alumina boat, and heated at 750° C. for 5 hours in an atmosphere of oxygen in a tube furnace.

The chemical composition of the heat-treated product was $Li_{1.02}NiO_2$.

Comparative Example 2

1.05 mol sodium hydroxide, 0.97 mol nickel hydroxide and 0.03 mol aluminum hydroxide were sufficiently mixed in dry state and pulverized in a mortar, and then pelletized into a size of 14 mm in diameter×2 mm in thickness. The resultant pellets were heated at 750° C. for 5 hours in an atmosphere of oxygen in a tube furnace.

The chemical composition of the heat-treated product was $Li_{1.04}Ni_{0.97}Al_{0.03}O_2$.

Comparative Example 3

1.05 mol sodium hydroxide, 0.97 mol nickel hydroxide and 0.03 mol ferric oxide were sufficiently mixed in dry state and pulverized in a mortar, and then pelletized into a size of 14 mm in diameter×2 mm in thickness. The resultant pellets were heated at 750° C. for 5 hours in an atmosphere of oxygen in a tube furnace.

The chemical composition of the heat-treated product was $Li_{1.04}Ni_{0.97}Fe_{0.03}O_2$.

Comparative Example 4

1.05 mol sodium hydroxide, 0.97 mol nickel hydroxide and 0.03 mol manganese dioxide were sufficiently mixed in dry state and pulverized in a mortar, and then pelletized into a size of 14 mm in diameter×2 mm in thickness. The resultant pellets were heated at 750° C. for 5 hours in an atmosphere of oxygen in a tube furnace.

The chemical composition of the heat-treated product was $Li_{1.04}Ni_{0.97}Mn_{0.03}O_2$.

Comparative Example 5

1.05 mol sodium hydroxide, 0.97 mol nickel hydroxide and 0.03 mol cobalt hydroxide were sufficiently mixed in dry state and pulverized in a mortar, and then pelletized into a size of 14 mm in diameter×2 mm in thickness. The resultant pellets were heated at 750° C. for 5 hours in an atmosphere of oxygen in a tube furnace.

The chemical composition of the heat-treated product was $Li_{1.04}Ni_{0.97}Co_{0.03}O_2$.

Comparative Example 6

1.05 mol sodium hydroxide, 0.97 mol nickel hydroxide and 0.03 mol magnesium oxide were sufficiently mixed in dry state and pulverized in a mortar, and then pelletized into a size of 14 mm in diameter×2 mm in thickness. The resultant pellets were heated at 750° C. for 5 hours in an atmosphere of oxygen in a tube furnace.

The chemical composition of the heat-treated product was $Li_{1.04}Ni_{0.97}Mg_{0.03}O_2$.

Comparative Example 7

A mixed aqueous solution of 2.0 mol/l aluminum nitrate and nickel nitrate wherein the molar ratio of Al/(Ni+Al) was 0.3. This mixed aqueous solution and 1.0 mol/l aqueous sodium hydroxide solution were simultaneously added at 25° C. with vigorous stirring while pH was kept at 8.5.

The obtained precipitate was filtered out, washed with water and suspended in water thereby obtaining a 1 mol/l $Ni_{0.7}Al_{0.3}(OH)_2(NO_3)_{0.3}$ slurry. A 3.0 mol/l aqueous lithium hydroxide solution was added dropwisely to the obtained slurry in an amount such that the atomic ratio of Li/(Ni+Al) was 1.05 with respect to the Ni content in the above slurry to effect reaction. Thereafter, the reaction mixture was spray dried. The obtained dry material was put in an alumina boat and heated at 750° C. for 5 hours in an atmosphere of oxygen in a tube furnace.

The chemical composition of the heat-treated product was $LiNi_{0.7}Al_{0.3}O_2$.

Comparative Example 8

A mixed aqueous solution of 2.0 mol/l ferric nitrate and nickel nitrate was prepared wherein the molar ratio of Fe/(Ni+Fe) was 0.3. This mixed aqueous solution and 1.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/l $Ni_{0.7}Fe_{0.3}(OH)_2(NO_3)_{0.3}$ slurry. A 3.0 mol/l aqueous lithium hydroxide solution was added dropwisely to the obtained slurry in an amount such that the atomic ratio of Li/(Ni+Fe) was 1.05 with respect to the Ni content in the above slurry to effect reaction. Thereafter, the reaction mixture was spray dried. The obtained dry material was put in a alumina boat and heated at 750° C. for 5 hours in an atmosphere of oxygen in a tube furnace.

The chemical composition of the heat-treated product was $LiNi_{0.7}Fe_{0.3}O_2$.

Comparative Example 9

A mixed aqueous solution of 1.0 mol/l magnesium nitrate and nickel nitrate was prepared wherein the molar ratio of Mg/(Ni+Mg) was 0.3. This mixed aqueous solution and 1.0 mol/l aqueous sodium hydroxide solution were simultaneously added at 25° C. with vigorous stirring while pH was kept at 11.0.

The obtained reaction mixture was filtered, washed with water and suspended in water thereby obtaining a 1 mol/l $Ni_{0.7}Mg_{0.3}(OH)_{1.7}(NO_3)_{0.3}$ slurry. A 3.0 mol/l aqueous lithium hydroxide solution was added dropwisely to the obtained slurry in an amount such that the atomic ratio of Li/(Ni+Mg) was 1.0 with respect to the Ni content in the above slurry to effect reaction. Thereafter, the reaction mixture was spray dried. The obtained dry material was put in an alumina boat and heated at 750° C. for 5 hours in an atmosphere of oxygen in a tube furnace to obtain powdery $LiNi_{0.7}Mg_{0.3}O_2$.

Comparative Example 10

A mixed aqueous solution of 1.0 mol/l manganese nitrate and nickel nitrate was prepared wherein the molar ratio of Mn/(Ni+Mn) was 0.6. This mixed aqueous solution, and 1.0 mol/l aqueous sodium hydroxide solution were simultaneously added at 25° C. with vigorous stirring while pH was kept at 8.5.

The obtained reaction mixture was filtered, washed with water and suspended in water thereby obtaining a 1 mol/l $Ni_{0.4}Mn_{0.6}(OH)_{1.7}(NO_3)_{0.3}$ slurry. A 3.0 mol/l aqueous lithium hydroxide solution was added dropwisely to the obtained slurry in an amount such that the atomic ratio of Li (Ni+Mn) was 1.05 with respect to the Ni content in the above slurry to effect reaction. Thereafter, the reaction mixture was spray dried. The obtained dry material was put in an alumina boat and heated at 750° C. for 5 hours in an atmosphere of oxygen in a tube furnace to obtain powdery $LiNi_{0.4}Mn_{0.6}O_2$.

Comparative Example 11

A mixed aqueous solution of 1.0 mol/l cobalt nitrate and nickel nitrate was prepared wherein the molar ratio of Co/(Ni+Co) was 0.6. This mixed aqueous solution and 1.0 mol/l aqueous sodium hydroxide solution were simultaneously added at 25° C. with vigorous stirring while pH was kept at 8.5.

The obtained precipitate was filtered out, washed with water and suspended in water thereby obtaining a 1 mol/l $Ni_{0.4}Co_{0.6}(OH)_{1.7}(NO_3)_{0.3}$ slurry. A 3.0 mol/l aqueous lithium hydroxide solution was added dropwisely to the obtained slurry in an amount such that the atomic ratio of Li/(Ni+Co) was 1.05 with respect to the Ni content in the above slurry to effect reaction. Thereafter, the reaction mixture was spray dried. The obtained spray-dried product was put in an alumina boat and heated at 750° C. for 5 hours in an atmosphere of oxygen in a tube furnace, and then pulverized in a mortar to obtain powdery $LiNi_{0.4}Co_{0.6}O_2$.

Comparative Example 12

1.05 mol sodium hydroxide, 0.9 mol nickel hydroxide and 0.1 mol aluminum hydroxide were sufficiently mixed in dry state and pulverized in a mortar, and then pressed into a shape under a static pressure of 1,000 kg/cm$^2$ using Brinell hardness tester. The shaped form was put in an alumina boat and heated at 750° C. for 20 hours in an atmosphere of oxygen in a tube furnace. After cooling, the heat-treated product was pulverized to obtain powdery $LiNi_{0.9}Al_{0.1}O_2$.

Comparative Example 13

1.05 mol sodium hydroxide, 0.9 mol nickel hydroxide and 0.1 mol ferric oxide were sufficiently mixed in dry state and pulverized in a mortar, and then pressed into a shape under a static pressure of 1,000 kg/cm$^2$ using Brinell hardness tester. The shaped form was put in an alumina boat and heated at 750° C. for 20 hours in an atmosphere of oxygen in a tube furnace. After cooling, the heat-treated product was pulverized to obtain powdery $LiNi_{0.9}Fe_{0.1}O_2$.

Comparative Example 14

1.05 mol sodium hydroxide, 0.9 mol nickel hydroxide and 0.1 mol manganese dioxide were sufficiently mixed in dry state and pulverized in a mortar, and then pressed into a shape under a static pressure of 1,000 kg/cm$^2$ using Brinell hardness tester. The shaped form was put in an alumina boat and heated at 750° C. for 20 hours in an atmosphere of oxygen in a tube furnace. After cooling, the heat-treated product was pulverized to obtain powdery $LiNi_{0.9}Mn_{0.1}O_2$.

Comparative Example 15

1.05 mol sodium hydroxide, 0.9 mol nickel hydroxide and 0.1 mol cobalt hydroxide were sufficiently mixed in dry state and pulverized in a mortar, and then pressed into a shape under a static pressure of 1,000 kg/cm$^2$ using Brinell hardness tester. The shaped form was put in an alumina boat and heated at 750° C. for 20 hours in an atmosphere of oxygen in a tube furnace. After cooling on standing, the heat-treated product was pulverized to obtain powdered $LiNi_{0.9}Co_{0.1}O_2$.

Tables 1 and 2 show the ratios in X-ray peak intensity (003)/(104) and (006)/(101) calculated from the X-ray diffraction patterns , BET specific surface area, $Ni^{3+}$ ratio (%), an average secondary particle size as measured by laser microtrack and long diameter of primary particle obtained from the SEM photograph, measured with respect to each of the compound oxides obtained in Examples 1~22 and Comparative Examples 1~15.

TABLE 1

The physical properties of the complex oxides obtained in Examples 1~22

| Example No. | $Ni^{3+}$ (%) | BET m$^2$/g | Ratio of I(003)/I(104) | Ratio of I(006)/I(101) | Average Particle Size ($\mu$) | Average Long Diameter of Primary Particle as Observed by SEM ($\mu$) |
|---|---|---|---|---|---|---|
| 1 | 99.4 | 0.44 | 1.43 | 0.119 | 15.91 | 0.51 |
| 2 | 99.7 | 0.51 | 1.48 | 0.114 | 19.61 | 0.40 |
| 3 | 99.6 | 0.30 | 1.49 | 0.113 | 18.21 | 0.40 |
| 4 | 99.3 | 0.32 | 1.53 | 0.111 | 16.41 | 0.35 |
| 5 | 99.8 | 0.09 | 1.57 | 0.118 | — | 5.0 |
| 6 | 99.1 | 0.31 | 1.4 | 0.112 | 16.57 | 0.45 |
| 7 | 99.6 | 0.12 | 1.5 | 0.110 | 15.41 | 0.29 |
| 8 | 99.7 | 0.28 | 1.5 | 0.120 | 16.22 | 0.31 |
| 9 | 99.9 | 0.06 | 1.5 | 0.122 | — | 6.30 |
| 10 | 99.7 | 0.41 | 1.324 | 0.119 | 6.04 | 0.45 |
| 11 | 99.3 | 0.58 | 1.4 | 0.121 | 21.09 | 0.39 |
| 12 | 99.3 | 0.43 | 1.5 | 0.117 | 18.67 | 0.41 |
| 13 | 99.8 | 0.08 | 1.5 | 0.121 | — | 4.0 |
| 14 | 99.8 | 0.42 | 1.4 | 0.110 | 15.51 | 0.37 |
| 15 | 99.4 | 0.58 | 1.5 | 0.115 | 18.96 | 0.43 |
| 16 | 99.8 | 0.36 | 1.65 | 0.121 | 20.60 | 0.45 |
| 17 | 99.6 | 0.61 | 1.4 | 0.120 | 16.40 | 0.45 |
| 18 | 99.8 | 0.82 | 1.4 | 0.119 | 16.83 | 0.41 |
| 19 | 99.9 | 0.07 | 1.323 | 0.113 | — | 3.8 |
| 20 | 99.8 | 0.10 | 1.4 | 0.118 | — | 4.0 |
| 21 | 99.8 | 0.17 | 1.304 | 0.115 | 58.66 | 0.45 |
| 22 | 99.9 | | 1.4 | 0.118 | — | 3.4 |

TABLE 2

The physical properties of the complex oxides obtained in Examples 1~15

| Comparative Example No. | $Ni^{3+}$ (%) | BET $m^2/g$ | Ratio of I(003)/I(104) | Ratio of I(006)/I(101) | Average Particle Size ($\mu$) | Average Long Diameter of Primary Particle as Obserbed by SEM ($\mu$) |
|---|---|---|---|---|---|---|
| 1 | 98.8 | 0.13 | 1.45 | 0.115 | 20.70 | 0.61 |
| 2 | 95.3 | 0.47 | 1.23 | 0.132 | — | 0.40 |
| 3 | 93.1 | 0.35 | 1.29 | 0.140 | — | 0.38 |
| 4 | 92.3 | 0.34 | 1.28 | 0.143 | — | 0.47 |
| 5 | 90.1 | 0.42 | 1.21 | 0.148 | — | 0.23 |
| 6 | 91.1 | 0.21 | 1.26 | 0.142 | — | 0.33 |
| 7 | 93.4 | 0.18 | 1.31 | 0.129 | 18.21 | 0.41 |
| 8 | 95.1 | 0.30 | 1.42 | 0.136 | 16.40 | 0.37 |
| 9 | 92.9 | 0.28 | 1.51 | 0.121 | 20.81 | 0.42 |
| 10 | 97.8 | 0.15 | 1.48 | 0.120 | 21.22 | 0.22 |
| 11 | 98.1 | 0.22 | 1.50 | 0.117 | 19.46 | 0.42 |
| 12 | 99.0 | 0.08 | 2.03 | 0.118 | — | 0.81 |
| 13 | 98.6 | 0.09 | 1.94 | 0.114 | — | 0.74 |
| 14 | 97.9 | 0.09 | 1.82 | 0.118 | — | 0.68 |
| 15 | 98.9 | 0.08 | 2.27 | 0.111 | — | 0.63 |

Also, the primary particle size of the basic metal salt (II) employed in the wet process is shown in Table 3.

TABLE 3

The physical properties of the basic metal salt employed in the reaction

| Example No. | Primary Particle Size/Scherrer's method (Angstrom) |
|---|---|
| Example 1 | 34.1 |
| Example 2 | 41.4 |
| Example 3 | 38.7 |
| Example 4 | 36.3 |
| Example 5 | 38.7 |
| Example 6 | 42.9 |
| Example 7 | 36.2 |
| Example 8 | 42.9 |
| Example 9 | 36.2 |
| Example 10 | 44.1 |
| Example 11 | 38.1 |
| Example 12 | 37.2 |
| Example 13 | 38.1 |
| Example 14 | 43.4 |
| Example 15 | 43.5 |
| Example 16 | 31.2 |
| Example 17 | 44.1 |
| Example 18 | 40.4 |
| Example 19 | 35.8 |
| Example 20 | 43.5 |
| Example 21 | 32.3 |
| Example 22 | 38.8 |

The long diameter of the primary particle size for all of the spray dried and heat-treated complex oxides were in the range of 0.2~3.0 $\mu$m.

Experiment 1

The following battery test (charge and discharge test) was carried out using the complex oxides obtained in Examples 1, 2, 6 and 14 and Comparative Examples 1, 2, 3 and 5.

For a positive electrode material, each of the lithium nickel complex oxides obtained in said Examples and said Comparative Examples was mixed with a conductive binder (polytetrafluoroethylene-acetylene black) in a weight ratio of 2:1. Thereafter, the mixture was formed into pellets, each having a thickness of 0.5 mm and a diameter of 18 mm. The resultant pellets were press-bonded at a pressure of 1 t/cm² to an expanded stainless steel mesh by means of a pressing machine, thereby obtaining a positive electrode molding.

As a negative electrode material, a disk 18 mm in diameter blanked from a lithium metal sheet was used. The positive electrode molding was put in a coin type cell composed of stainless steel, and an electrolyte in which 1 mol/l $LiPF_6$ was dissolved in a 1:4 mixture of propylene carbonate and ethylene carbonate was poured into the cell in an appropriate amount. A separator, the above negative electrode and its case were piled in this order on the electrolyte, thereby obtaining a lithium secondary battery for testing. All of the above procedures were conducted in an atmosphere of argon. The performance of the positive electrode active material was evaluated by repeating charging and discharging the lithium secondary battery and measuring the initial discharge capacity and the discharge capacity decrease attributed to the repetition of charging and discharging. The above charging and discharging were performed under a voltage control between 3 V and 4.3 V at a constant current of 1 mA.

The results of the battery test [initial discharge capacity (mAh/g), discharge capacity at 100th cycle (mAh/g) and decrease in rate of discharge capacity at 100th cycle are shown in Tables 4 and 5.

TABLE 4

| Example No. | Initial Discharge Capacity (mAh/g) | Discharge Capacity at 100th Cycle (mAh/g) | Decrease Rate of Discharge Capacity at 100th Cycle (%) |
|---|---|---|---|
| 1 | 157.0 | 145.5 | 7.3 |
| 2 | 161.0 | 146.6 | 8.9 |
| 6 | 160.1 | 148.2 | 7.4 |
| 14 | 160.2 | 146.2 | 8.7 |

TABLE 5

| Comparative Example No. | Initial Discharge Capacity (mAh/g) | Discharge Capacity at 100th Cycle (mAh/g) | Decrease Rate of Discharge Capacity at 100th Cycle (%) |
|---|---|---|---|
| 1 | 161.5 | 113.2 | 29.9 |
| 2 | 141.5 | 98.5 | 30.4 |
| 3 | 140.4 | 84.3 | 39.9 |
| 5 | 140.2 | 97.3 | 30.6 |

Experiment 2

The following battery test (charge and discharge test) was carried out using the complex oxides obtained in Examples 1~22 and Comparative Examples 1~15.

For a positive electrode material, each of the lithium nickel compound oxides obtained in the above Examples and Comparative Examples, ethylene black as a conductive agent and polytetrafluoroethylene as a binder were mixed in a ratio of 88:6:6% by weight. Thereafter, the mixture was subjected to compression molding on stainless steel mesh, thereby obtaining pellets each having a thickness of 5 mm and a diameter of 18 mm. The resultant pellets were dried at 200° C. for 2 hours, and used as a positive electrode material.

A rolled lithium metal sheet pressed-bonded to a stainless substrate was used as a negative electrode material. A porous membrane made of polypropylene (trade name "Cell Guard", a product of Hoechst Japan Co., Ltd.) and a glass filter-paper filter was used as a diaphragm. There was used an electrolyte in which 1 M LiClO$_4$ was dissolved in an ethylene carbonate/dimethylmethoxyethane mixture (1:1 weight ratio). The procedures up to completion from setup of a test cell (semi-open type cell) were conducted in an argon replaced dry box. The charging and discharging for this lithium battery were performed under a voltage control between 3 V and 4.3 V at a constant current density of 0.4 mA/cm$^2$.

The results of the battery test [initial discharge capacity (mAh/g), discharge capacity at 100th cycle (mAh/g) and decrease rate of discharge capacity at 100th cycle (%)] are shown in Tables 6 and 7.

TABLE 6

| Example No. | Initial Discharge Capacity (mAh/g) | Discharge Capacity at 100th Cycle (mAh/g) | Decrease Rate of Discharge Capacity at 100th Cycle (%) |
|---|---|---|---|
| 1 | 187.9 | 174.9 | 6.9 |
| 2 | 181.2 | 166.2 | 8.3 |
| 3 | 169.1 | 161.8 | 4.3 |
| 4 | 151.0 | 139.8 | 7.5 |
| 5 | 158.0 | 154.0 | 3.5 |
| 6 | 167.6 | 153.7 | 8.3 |
| 7 | 144.8 | 132.5 | 8.5 |
| 8 | 142.3 | 131.3 | 7.7 |
| 9 | 136.1 | 129.7 | 4.7 |
| 10 | 166.4 | 156.7 | 5.8 |
| 11 | 168.7 | 159.3 | 5.6 |
| 12 | 154.3 | 141.8 | 8.1 |
| 13 | 157.8 | 150.8 | 4.4 |
| 14 | 171.2 | 157.3 | 8.1 |
| 15 | 171.1 | 164.2 | 7.3 |
| 16 | 182.9 | 168.1 | 8.1 |
| 17 | 171.3 | 165.8 | 3.2 |
| 18 | 163.0 | 153.5 | 5.8 |
| 19 | 172.4 | 165.8 | 3.8 |
| 20 | 159.8 | 152.1 | 4.8 |
| 21 | 162.6 | 151.9 | 6.6 |
| 22 | 161.3 | 154.8 | 4.0 |

TABLE 7

| Comparative Example No. | Initial Discharge Capacity (mAh/g) | Discharge Capacity at 100th Cycle (mAh/g) | Decrease Rate of Discharge Capacity at 100th Cycle (%) |
|---|---|---|---|
| 1 | 188.4 | 137.9 | 26.8 |
| 2 | 162.5 | 111.3 | 31.5 |
| 3 | 151.0 | 85.8 | 43.2 |
| 4 | 158.4 | 101.9 | 35.7 |
| 5 | 165.0 | 124.9 | 24.3 |
| 6 | 146.3 | 97.6 | 33.3 |
| 7 | 138.9 | 123.9 | 10.8 |
| 8 | 135.0 | 116.2 | 13.9 |
| 9 | 141.3 | 125.1 | 11.5 |
| 10 | 137.3 | 120.6 | 12.2 |
| 11 | 156.2 | 138.0 | 11.7 |
| 12 | 148.3 | 90.2 | 39.2 |
| 13 | 135.0 | 87.6 | 35.1 |
| 14 | 149.1 | 92.1 | 38.2 |
| 15 | 159.2 | 130.6 | 18.0 |

Experiment 3

As an index indicating that the complex oxides obtained in the present invention are stable at an elevated temperature, an exothermic reaction temperature of the positive electrode material after charging was measured by the following method.

Using the test cell prepared in Experiment 2, the positive electrode material after charging was subjected to thermal analysis by DSC ("THERMOFLEX TAS200", a product of Rigaku Co., Ltd.) under an inert gas to measure the exothermic reaction temperature.

As a result, the peak of exothermic heat was recognized to appear at 208.6° C. for Comparative Example 1, 224.3° C. for Example 15 and at 237.6° C. for Example 20.

The temperature rise in the exothermic peak by introduction of Co etc. into LiNiO$_2$ was recognized. Furthermore, it is understood that the positive electrode material composed of larger primary particle size, even among those having the same composition, gives a higher exothermic peak temperature, thereby the stability of the positive electrode material at an elevated temperature is enhanced.

Industrial Applicability

As explained above, according to the present invention there is provided a novel lithium nickel complex oxide represented by the general formula:

$$Li_{y-x1}Ni_{1-x2}M_xO_2$$

wherein M represents one selected from the group consisting of Al, Fe, Co, Mn and Mg, $x=x_1+x_2$, $0<x_1 \leq 0.2$, $0<x_2 \leq 0.5$, $0 < x \leq 0.5$, and $0.9 \leq y \leq 1.3$, and wherein the crystals have been sufficiently developed and are highly purified, and a positive electrode active material for a secondary battery whose stability of high discharge capacity is excellent.

We claim:

1. A process for preparing a lithium nickel complex oxide represented by the general formula (I)

$$Li_{y-x1}Ni_{1-x2}M_xO_2 \qquad (I)$$

wherein M represents a metal selected from the group consisting of Al and Mg, $x = x_1 + x_2$, and
- (i) when M is Al, then x, $x_1$ and $x_2$ represent respectively $0 < x \leq 0.2$, $x_1 = 0$, and $x_2 = x$;
- (ii) when M is Mg, then x, $x_1$ and $x_2$ represent respectively $0 < x \leq 0.2$, $0 < x_1 \leq 0.2$ and $0 < x_2 \leq 0.2$; and y represents $0.9 \leq y \leq 1.3$, said process comprising the steps of:
- (a) reacting a basic metal salt represented by the general formula (II)

$$Ni_{1-x}M^p{}_x(OH)_{2-nz}(A^{n-})_{(z+(px-2x)/n)} \cdot mH_2O \qquad (II)$$

with a water soluble lithium compound in an aqueous medium in a molar ratio of Li/(Ni+M) of 0.9~1.3 to obtain a slurry, wherein M represents a metal selected from the group consisting of Al and Mg, p is a valence number of M with $2 \leq p \leq 3$, $A^{n-}$ is an anion having a valence of n, and x, z and m are positive numbers respectively satisfying the ranges of $0 < x \leq 0.2$, $0.03 \leq z \leq 0.3$, $0 \leq m < 2$;
- (b) spray drying the obtained slurry; and
- (c) heating the resultant dry material at a temperature of about 600° C.~900° C. for about 4 hours or more in an oxidative atmosphere.

2. A Process for preparing a lithium nickel complex oxide represented by the general formula (I)

$$Li_{y-x1}Ni_{1-x2}M_xO_2 \qquad (I)$$

wherein M represents a metal selected from the group consisting of Al and Mg, $x = x_1 + x_2$, and
- (i) when M is Al, then x, $x_1$ and $x_2$ represent respectively $0 < x \leq 0.2$, $x_1 = 0$, and $x_2 = x$;
- (ii) when M is Mg, then x, $x_1$ and $x_2$ represent respectively $0 < x \leq 0.2$, $0 < x_1 \leq 0.2$ and $0 < x_2 \leq 0.2$; and y represents $0.9 \leq y \leq 1.3$, said process comprising the steps of:
- (a) reacting a basic metal salt represented by the general formula (II)

$$Ni_{1-x}M^p{}_x(OH)_{2-nz}(A^{n-})_{(z+(px-2x)/n)} \cdot mH_2O \qquad (II)$$

with a water soluble lithium compound in an aqueous medium in a molar ratio of Li/(Ni+M) of 0.9~1.3 to obtain a slurry, wherein M represents a metal selected from the group consisting of Al and Mg, p is a valence number of M with $2 \leq p \leq 3$, $A^{n-}$ is an anion having a valence of n, and x, z and m are positive numbers respectively satisfying the ranges of $0 < x \leq 0.2$, $0.03 \leq z \leq 0.3$, $0 \leq m < 2$;
- (b) spray drying the obtained slurry;
- (c) subjecting the spray dried product to press molding; and
- (d) heating the molded product at a temperature of about 600° C.~900° C. for about 4 hours or more in an oxidative atmosphere.

3. A process for preparing a lithium nickel complex oxide represented by the general formula (I)

$$Li_{y-x1}Ni_{1-x2}M_xO_2 \qquad (I)$$

wherein M represents a metal selected from the group consisting of Al and Mg, $x = x_1 + x_2$, and
- (i) when M is Al, then x, $x_1$ and $x_2$ represent respectively $0 < x \leq 0.2$, $x_1 = 0$, and $x_2 = x$;
- (ii) when M is Mg, then x, $x_1$ and $x_2$ represent respectively $0 < x \leq 0.2$, $0 < x_1 \leq 0.2$ and $0 < x_2 \leq 0.2$; and y represents $0.9 \leq y \leq 1.3$, said process comprising the steps of:
- (a) reacting a basic metal salt represented by the general formula (II)

$$Ni_{1-x}M^p{}_x(OH)_{2-nz}(A^{n-})_{(z+(px-2x)/n)} \cdot mH_2O \qquad (II)$$

with a water soluble lithium compound in an aqueous medium in a molar ratio of Li/(Ni+M) of 0.9~1.3 to obtain a slurry, wherein M represents a metal selected from the group consisting of Al and Mg, p is a valence number of M with $2 \leq p \leq 3$, $A^{n-}$ is an anion having a valence of n, and x, z and m are positive numbers respectively satisfying the ranges of $0 < x \leq 0.2$, $0.03 \leq z \leq 0.3$, $0 \leq m < 2$;
- (b) spray drying the obtained slurry;
- (c) heating the spray dried product at a temperature of about 600° C.~900° C. for about 0.5 hour or more in an oxidative atmosphere;
- (d) pulverizing the resultant heat-treated product;
- (e) subjecting the pulverized heat-treated product to press molding; and
- (f) re-heating the molded product at a temperature of about 600° C.~900° C. for about 1 hour or more in an oxidative atmosphere.

* * * * *